United States Patent
Kim et al.

(10) Patent No.: US 10,798,513 B2
(45) Date of Patent: Oct. 6, 2020

(54) HEAD-RELATED TRANSFER FUNCTION GENERATION

(71) Applicant: QUALCOMM Incorporated, San Diego, CA (US)

(72) Inventors: Lae-Hoon Kim, San Diego, CA (US); Dongmei Wang, San Diego, CA (US); Erik Visser, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/206,680

(22) Filed: Nov. 30, 2018

(65) Prior Publication Data

US 2020/0178014 A1  Jun. 4, 2020

(51) Int. Cl.
*H04S 7/00* (2006.01)
*H04S 3/00* (2006.01)
*G06N 3/08* (2006.01)

(52) U.S. Cl.
CPC ............ *H04S 7/303* (2013.01); *G06N 3/08* (2013.01); *H04S 3/008* (2013.01); *H04S 7/305* (2013.01); *H04S 2400/01* (2013.01); *H04S 2420/01* (2013.01)

(58) Field of Classification Search
CPC .......... H04S 7/303; H04S 7/305; H04S 3/008; H04S 2400/01; H04S 2420/01; G06N 3/08
See application file for complete search history.

(56) References Cited

U.S. PATENT DOCUMENTS

| 5,742,689 | A | * | 4/1998 | Tucker | H04S 3/004 381/17 |
|---|---|---|---|---|---|
| 10,028,070 | B1 | * | 7/2018 | Gamper | G06K 9/00268 |
| 2008/0137870 | A1 | * | 6/2008 | Nicol | H04S 7/301 381/17 |
| 2015/0010160 | A1 | * | 1/2015 | Udesen | H04R 25/70 381/60 |
| 2015/0156599 | A1 | * | 6/2015 | Romigh | H04S 5/005 381/17 |
| 2016/0269849 | A1 | * | 9/2016 | Riggs | H04S 7/304 |
| 2018/0270603 | A1 | * | 9/2018 | Gamper | H04S 7/304 |
| 2018/0310115 | A1 | * | 10/2018 | Romigh | H04S 3/008 |

* cited by examiner

*Primary Examiner* — Jason R Kurr
(74) *Attorney, Agent, or Firm* — Holland & Hart LLP

(57) ABSTRACT

Methods, systems, and devices for head-related transfer function generation are described. A device may receive a digital representation of a first audio signal associated with a location relative to a subject, and select from a database a first reference head-related transfer function measurement pair corresponding to the location of the first audio signal. The device may then obtain a second head-related transfer function measurement pair by performing a style transfer operation on the selected reference head-related transfer function measurement pair based on a set of head-related transfer function measurement pairs specific to the subject. As a result, the device may output a second audio signal based on the digital representation of the first audio signal and the second head-related transfer function measurement pair.

20 Claims, 15 Drawing Sheets

HEAD-RELATED TRANSFER FUNCTION GENERATION

BACKGROUND

The following relates generally to head-related transfer function generation. A person may perceive a sound spatial position based on differences between arrival characteristics of a sound signal. For example, a head-related transfer function may be a response that characterizes how an ear receives a sound signal from a point in space. The physical dimensions of the person's head, ears, ear canal, among others, may all transform the sound signal and affect how it is perceived by the person (e.g., amplifying some frequencies and attenuating others). The relationship between the spatial position of a sound source of the sound signal and the arrival characteristics of the sound signal at the target person has been represented by a pair of head-related transfer functions. A pair of head-related transfer functions for a person can be used to synthesize a binaural sound that seems to come from a particular point in space. Existing techniques however may be ineffective for individualizing head-related transfer function measurements, and therefore generating (and outputting) individualized sound signals for a person.

SUMMARY

The described techniques relate to improved methods, systems, devices, and apparatuses that support head-related transfer function generation. Generally, the described techniques provide for outputting an audio signal according to a digital representation of an audio signal and a head-related transfer function measurements pair. For example, to mitigate challenges related to existing techniques, a style transfer operation may be used when determining arrival characteristics of an audio signal. The style transfer operation may combine content features of one audio signal with style features of another audio signal (e.g., head-related transfer function measurement pairs) for generating and outputting an individualized audio signal. The output of the style transfer operation may be an individualized head-related transfer function measurement pair.

A method is described. The method may include receiving a digital representation of a first audio signal associated with a location relative to a subject, selecting from a database a first reference head-related transfer function measurement pair corresponding to the location of the first audio signal, obtaining a second head-related transfer function measurement pair by performing a style transfer operation on the selected reference head-related transfer function measurement pair based on a set of head-related transfer function measurement pairs specific to the subject, and outputting a second audio signal based on the digital representation of the first audio signal and the second head-related transfer function measurement pair.

An apparatus is described. The apparatus may include a processor, memory in electronic communication with the processor, and instructions stored in the memory. The instructions may be executable by the processor to cause the apparatus to receive a digital representation of a first audio signal associated with a location relative to a subject, select from a database a first reference head-related transfer function measurement pair corresponding to the location of the first audio signal, obtain a second head-related transfer function measurement pair by performing a style transfer operation on the selected reference head-related transfer function measurement pair based on a set of head-related transfer function measurement pairs specific to the subject, and output a second audio signal based on the digital representation of the first audio signal and the second head-related transfer function measurement pair.

Another apparatus is described. The apparatus may include means for receiving a digital representation of a first audio signal associated with a location relative to a subject, selecting from a database a first reference head-related transfer function measurement pair corresponding to the location of the first audio signal, obtaining a second head-related transfer function measurement pair by performing a style transfer operation on the selected reference head-related transfer function measurement pair based on a set of head-related transfer function measurement pairs specific to the subject, and outputting a second audio signal based on the digital representation of the first audio signal and the second head-related transfer function measurement pair.

A non-transitory computer-readable medium storing code is described. The code may include instructions executable by a processor to receive a digital representation of a first audio signal associated with a location relative to a subject, select from a database a first reference head-related transfer function measurement pair corresponding to the location of the first audio signal, obtain a second head-related transfer function measurement pair by performing a style transfer operation on the selected reference head-related transfer function measurement pair based on a set of head-related transfer function measurement pairs specific to the subject, and output a second audio signal based on the digital representation of the first audio signal and the second head-related transfer function measurement pair.

Some examples of the method, apparatuses, and non-transitory computer-readable medium described herein may further include operations, features, means, or instructions for determining the first reference head-related transfer function measurement pair in the database satisfies a threshold match value, where selecting from the database the first reference head-related transfer function measurement pair may be based on the threshold match value.

Some examples of the method, apparatuses, and non-transitory computer-readable medium described herein may further include operations, features, means, or instructions for measuring a set of head-related impulse responses associated with a training audio signal, determining the set of head-related transfer function measurement pairs specific to the subject using a deep learning scheme on the set of head-related impulse responses, and storing in the database the set of head-related transfer function measurement pairs specific to the subject.

Some examples of the method, apparatuses, and non-transitory computer-readable medium described herein may further include operations, features, means, or instructions for measuring a set of reverberation signals associated with the training audio signal, where determining the set of head-related transfer function measurement pairs specific to the subject may be further based on using the deep learning scheme on the set of head-related impulse responses and the set of reverberation signals specific to the subject.

In some examples of the method, apparatuses, and non-transitory computer-readable medium described herein, the deep learning scheme includes a convolutional neural network.

Some examples of the method, apparatuses, and non-transitory computer-readable medium described herein may further include operations, features, means, or instructions for generating a physical model specific to the subject to measure the set of head-related impulse responses associated with the training audio signal for a set of locations specific to the subject, where determining the set of head-related transfer function measurement pairs may be further based on the physical model specific to the subject.

Some examples of the method, apparatuses, and non-transitory computer-readable medium described herein may further include operations, features, means, or instructions for measuring a first head-related transfer function measurement pair for a first location from the set of locations using a non-existing angle, measuring a second head-related transfer function measurement pair for the first location from the set of locations using an existing angle, and determining an estimated head-related transfer function measurement pair for the non-existing angle specific to the subject by performing the style transfer operation on the first head-related transfer function measurement pair and the second head-related transfer function measurement pair.

Some examples of the method, apparatuses, and non-transitory computer-readable medium described herein may further include operations, features, means, or instructions for obtaining a third head-related transfer function measurement pair by performing a regularization on the second head-related transfer function measurement pair, where outputting the second audio signal based on the digital representation of the first audio signal and the third head-related transfer function measurement pair.

DETAILED DESCRIPTION

Figure 1:
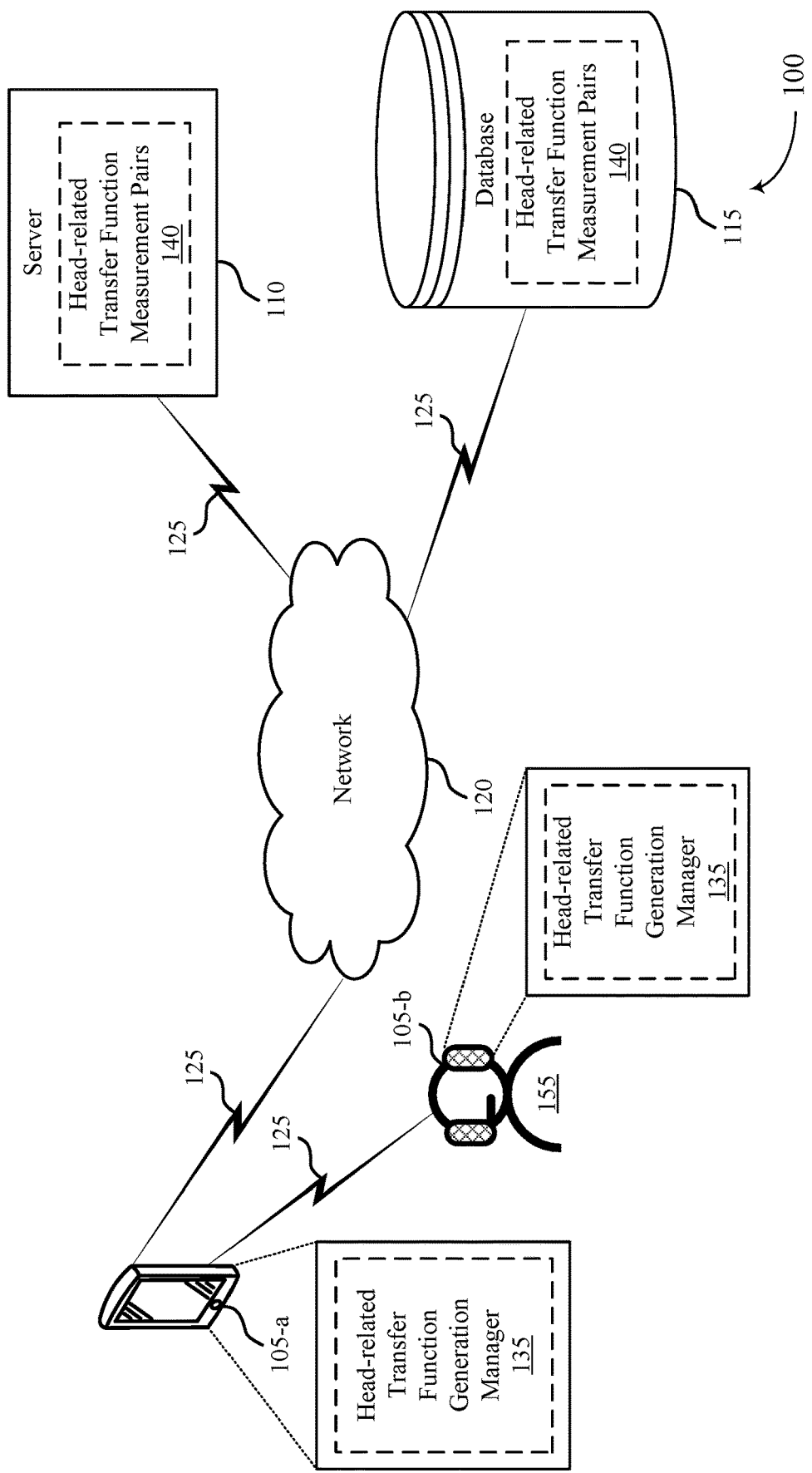
FIG. 1 illustrates an example of a system that supports head-related transfer function generation in accordance with aspects of the present disclosure.

A head-related transfer function also referred to as an anatomical transfer function may be a response relating to arrival characteristics of an audio signal. A person may observe an audio spatial position based on differences between arrival characteristics of the audio signal. For example, a head-related transfer function may be a response that characterizes how an ear receives an audio signal (e.g., a sound) from a point in space. The relationship between the spatial position of an audio source of the audio signal and the arrival characteristics of the audio signal at a target person has been represented by a pair of head-related transfer functions.

A pair of head-related transfer functions for a person can be used to synthesize a binaural sound that seems to come from a particular point in space. It is a transfer function that explains how an audio signal from a specific point in space will arrive at the person. Some public-domain databases provide head-related transfer function measurements relating to different arrival characteristics of an audio signal (e.g., a sound). Although these databases may be effective for generating (and outputting) audio signals using premeasured head-related transfer function pairs, there may be instances where head-related transfer function measurements in these databases may not have a sufficient similarity to a binaural sound specific for an individual person (e.g., missing interaural-polar azimuths and/or interaural-polar elevations in the head-related transfer function measurements, or the like). Therefore, these public-domain databases may be ineffective for individualizing head-related transfer function measurements, and therefore generating (and outputting) individualized audio signals.

To support individualizing head-related transfer function measurement pairs, a style transfer operation may be used when determining arrival characteristics of an audio signal. The style transfer operation may combine content features of one audio signal with style features of another audio signal (e.g., head-related transfer function measurement pairs) for generating and outputting an individualized audio signal. For example, one input to the style transfer operation may be a reference head-related transfer function measurement (e.g., to be used as a reference for content features) selected from a database. Another input to the style transfer operation may be the measured head-related transfer function of the audio signal itself at a reception point (e.g., person's eardrums). The output of the style transfer operation may be an individualized head-related transfer function measurement. In this way, the improved techniques obtain reference head-related transfer function pairs for specific directions to generate audio head-related transfer function content, obtain a number of randomly measured head-related transfer function pairs from a target person to generate an audio head-related transfer function style using machine learning, and generate head-related transfer function pairs of the audio signal for multiple directions.

Aspects of the disclosure are initially described in the context of a system that supports head-related transfer function generation. Aspects of the disclosure are then described with reference to pipelines and process flows that relate to head-related transfer function generation. Aspects of the disclosure are further illustrated by and described with reference to apparatus diagrams, system diagrams, and flowcharts that relate to head-related transfer function generation.

FIG. 1 illustrates an example of a system 100 that supports head-related transfer function generation in accordance with aspects of the present disclosure. The system 100 may include devices 105, a server 110, and a database 115. Although, the system 100 illustrates two devices 105, a single server 110, a single database 115, and a single network 120, the present disclosure applies to any system architecture having one or more devices 105, servers 110, databases 115, and networks 120. The devices 105, the server 110, and the database 115 may communicate with each other and exchange information that supports head-related transfer function generation, such as head-related transfer function measurement pairs, audio data, or audio control information, via network 120 using communications links 125. In some cases, a portion or all of the techniques described herein supporting head-related transfer function generation may be performed on the devices 105 or the server 110, or both.

The devices 105 may be a cellular phone, a smartphone, a hearable device (e.g., smart headphones, smart earbuds, smart headset), a personal digital assistant (PDA), a wireless communication device, a handheld device, a tablet computer, a laptop computer, a cordless phone, a display device (e.g., monitors), and/or the like that supports various types of communication and functional features related to head-related transfer function generation for example, transmitting, receiving, and storing head-related transfer function measurement data. The devices 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, the devices 105 may be able to receive from or transmit to another device 105 variety of information, such as instructions or commands (e.g., head-related transfer function generation-related information).

The devices 105 may support head-related transfer functions, which may capture transformations of a propagating sound wave. For example, device 105-*a* may be a smartphone, which may broadcast a sound wave (e.g. an audio signal) towards device 105-*b*, which may be a hearable device (e.g., smart headphones, smart earbuds, smart headset) wearable by a person 155. Some of the transformations of the propagating sound wave may include diffractions and reflections on (anatomical) parts of the person 155, such as head, pinnae, shoulders, and torso, among others, as well diffractions and reflections on objects within an environment (e.g., a room). The devices 105 may generate an illusion of a spatially located sound respective to the person 155 according to a head-related transfer function.

A head-related transfer function may be a response that characterizes how an ear receives a sound wave from a point in space. The head-related transfer function may be a Fourier transform of a head-related impulse response, which may be a complex function defined for each ear of the person 155, having both information about the magnitude and phase shift. For example, the head-related impulse responses for the left and the right ear of the person 155 may be expressed in time domain as $h_L(t)$ and $h_R(t)$, respectively. In frequency domain the head-related impulse responses may be expressed as $H_L(\omega)$ and $H_R(\omega)$. The head-related transfer function may be dependent on the location of a sound source (e.g., location of device 105-*a* relative to device 105-*b*) relative to the person 155. Therefore, the relationship between the spatial position of a sound source of a sound wave and arrival characteristics of the sound wave at the person 155 can be represented by a pair of head-related transfer functions. Either or both the device 105-*a* and the device 105-*b* may use a head-related transfer function measurement pair for the person 155 to synthesize a binaural sound that seems to come from a particular point in space. In some examples, either or both the device 105-*a* and the device 105-*b* may estimate binaural room impulse responses and filter out the binaural head-related transfer impulse responses by removing all the diffractions and reflection parts. The device 105-*a* may synthesize a binaural sound without reverberations (e.g., diffractions and reflections).

Some public-domain databases provide head-related transfer function measurements relating to different arrival characteristics of a sound wave. While these databases may be effective for generating (and outputting) sound using premeasured head-related transfer function pairs, there may be instances where head-related transfer function measurements in these databases may not have a sufficient similarity to a binaural sound specific for the person 155 (e.g., missing interaural-polar azimuths and/or interaural-polar elevations in the head-related transfer function measurements, or the like). To resolve challenges with these present public-domain databases, a style transfer operation may be used when determining arrival characteristics of a sound (e.g., an audio signal). The style transfer operation may combine content features of one sound signal with style features of another sound signal (e.g., head-related transfer function measurement pairs) for generating and outputting an individualized sound signal. For example, one input to the style transfer operation may be a reference head-related transfer function measurement (e.g., to be used as a reference for content features) selected from the database 115. Another input to the style transfer operation may be the measured head-related transfer function of a sound signal itself at a reception point (e.g., person's 155 eardrums). Therefore, the output of the style transfer operation may be an individualized head-related transfer function measurement.

The devices 105 may include a head-related transfer function generation manager 135. While, the system 100 illustrates both devices 105 including the head-related transfer function generation manager 135, it may be an optional feature for the devices 105. In some examples, the devices 105 may have an application that may receive information (e.g., download, stream) from the server 110, database 115 or another device 115, or transmit (e.g., upload, broadcast) head-related transfer function generation data to the server 110, the database 115, or to another device 115 via using communications links 125.

For example, the devices 105 may receive a digital representation of a first audio signal associated with a location relative to the person 155, and select from the database 115 a first reference head-related transfer function measurement pair corresponding to the location of the first audio signal. In some examples, the devices 105 may determine that the first reference head-related transfer function measurement pair in the database 115 satisfies a threshold match value, and thereby selecting the first reference head-related transfer function measurement pair. The devices 105 may obtain a second head-related transfer function measurement pair by performing a style transfer operation on the selected reference head-related transfer function measurement pair based on a set of head-related transfer function measurement pairs specific to the person 155, and output a second audio signal based on the digital representation of the first audio signal and the second head-related transfer function measurement pair. Therefore, the devices 105 may generate a high-resolution individualized head-related transfer function measurement pair (data) using a set number of head-related transfer function measurements.

In accordance with aspects of the present disclosure, the devices 105 may, as part of a training phase, measure a set of head-related impulse responses associated with a training audio signal, and determine the set of head-related transfer function measurement pairs specific to the person 155 using a deep learning scheme (e.g., a convolutional neural network) on the set of head-related impulse responses. The devices 105 may store in the database 115 the set of head-related transfer function measurement pairs specific to the person 155. In some examples, the devices 105 may measure a set of reverberation signals associated with the training audio signal. In this example, the devices 105 may determine the set of head-related transfer function measurement pairs specific to the person 155 using the deep learning scheme on the set of head-related impulse responses and the set of reverberation signals specific to the person 155.

In some examples, the devices 105 may generate a physical model specific to the person 155 to measure the set of head-related impulse responses associated with the training audio signal for a set of locations specific to the person 155. For example, the devices 105 may measure a first head-related transfer function measurement pair for a first location from the set of locations using a non-existing, and measure a second head-related transfer function measurement pair for the first location from the set of locations using an existing angle. The devices 105 may determine an estimated head-related transfer function measurement pair for the non-existing angle specific to the person 155 by performing the style transfer operation on the first head-related transfer function measurement pair and the second head-related transfer function measurement pair. In some examples, the devices 105 may obtain a third head-related transfer function measurement pair by performing a regularization on the second head-related transfer function measurement.

Additionally, or alternatively as part of the training phase, the devices 105 may use a number of head-related transfer function datasets (e.g., databases). For example, the devices 105 may use two different head-related transfer function datasets. In some examples, a set of head-related transfer function pairs from a first head-related transfer function dataset may be used as content features, while a different set of head-related transfer function pairs from a second head-related transfer function dataset may be used as style features. In some examples, the devices 105 may generate the first head-related transfer function dataset based at least in part on a physical model of the person 155 to have high-resolution representation, as described herein. In some examples, the second head-related transfer function dataset may include reverberation such that the generated dataset may include the reverberation. In this example, the first head-related transfer function dataset may be absent of reverberation, while the second head-related transfer function dataset may include reverberation. The devices 105 may use the head-related transfer function pairs from the first and second head-related transfer function dataset to generate a third head-related transfer function dataset including a set function of head-related transfer pairs. The set of head-related transfer function pairs in the third head-related transfer function dataset may be within a similarity threshold of the set of head-related transfer function pairs in the second head-related transfer function dataset.

In accordance with aspects of the present disclosure, as part of a deployment phase, the devices 105 may measure a number of person 155 specific head-related transfer function measurement pairs, which maybe used as style features, and the devices 105 may use a reference dataset as content features. The devices 105 may then generate a head-related transfer function measurement dataset with person's 155 style features. The reference dataset may be a nearest dataset above a certain threshold. In some examples, the reference dataset may be a physical model of the person 155 to have high resolution for non-existing angle pairs. The number of person 155 specific head-related transfer function measurement pairs may include reverberation such that the generated head-related transfer function measurement dataset with person's 155 style features can also have such reverberation. For example, the devices 105 may receive a digital representation of an audio signal associated with a location relative to the person 155, and measure a set of head-related transfer function measurement pairs associated with the audio signal. These measured head-related transfer function measurement pairs may be used as styles features. The devices 105 may obtain an individualized head-related transfer function measurement pair by performing a style transfer operation on the measured head-related transfer function measurement pairs and reference head-related transfer function measurement pairs (e.g., from a reference head-related transfer function measurement pair database (e.g., the set of head-related transfer function pairs in the third head-related transfer function dataset as described in the training phase)), and output a second audio signal based on the digital representation of the audio signal and the individualized head-related transfer function measurement pair. Therefore, the devices 105 may generate a high-resolution individualized head-related transfer function measurement pair (data) using a set number of head-related transfer function measurements The head-related transfer function generation manager 135 may be part of a general-purpose processor, a digital signal processor (DSP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof) or other programmable logic device, discrete gate or transistor logic, discrete hardware components, or any combination thereof designed to perform the functions described in the present disclosure, and/or the like. For example, the head-related transfer function generation manager 135 may process data (e.g., audio signals, training signals, head-related impulse responses, reverberation signals) from and/or write data (e.g., head-related transfer function measurement pairs) to a local memory of the device 105 or to the database 115.

The server 110 may be a data server, a cloud server, a proxy server, a web server, an application server, a communications server, a home server, a mobile server, or any combination thereof. The server 110 may optionally include a head-related transfer function measurement pairs 140. The head-related transfer function measurement pairs 140 may allow the devices 105 to download head-related transfer function measurement pairs 140 using communications links 125, which the devices 105 may use to output an audio signal according to a digital representation of an audio signal and a head-related measurements pair from the head-related transfer function measurement pairs 140. The server 110 may also transmit to the devices 105 a variety of information, such as instructions or commands (e.g., audio signals, training signals, head-related impulse responses, reverberation signals).

The database 115 may store a variety of information, such as instructions or commands (e.g., head-related transfer function generation information). For example, the database 115 may optionally store head-related transfer function measurement pairs 140. The devices 105 may support outputting an audio signal according to a digital representation of an audio signal and a head-related measurements pair from the head-related transfer function measurement pairs 140. The devices 105 may retrieve the stored data from the database 115 via the network 120 using communication links 125. In some examples, the database 115 may be a relational database (e.g., a relational database management system (RDBMS) or a Structured Query Language (SQL) database), a non-relational database, a network database, an object-oriented database, among others that stores the variety of information, such as instructions or commands (e.g., head-related transfer function information).

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G) for example), etc. Network 120 may include the Internet.

The communications links 125 shown in the system 100 may include uplink transmissions from the device 105 to the server 110 and the database 115, and/or downlink transmissions, from the server 110 and the database 115 to the device 105. The wireless links 125 may transmit bidirectional communications and/or unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

The techniques described herein may provide improvements in head-related transfer function generation. Furthermore, the techniques described herein may provide benefits and enhancements to the operation of the devices 105. For example, by supporting an efficient and effective techniques for head-related transfer function generation, the operational characteristics, such as power consumption, processor utilization (e.g., CPU processing utilization), and memory usage of the devices 105 may be reduced. The techniques described herein may also provide efficiency to the devices 105 by reducing latency associated with processes related to head-related transfer function generation.

Figure 2:
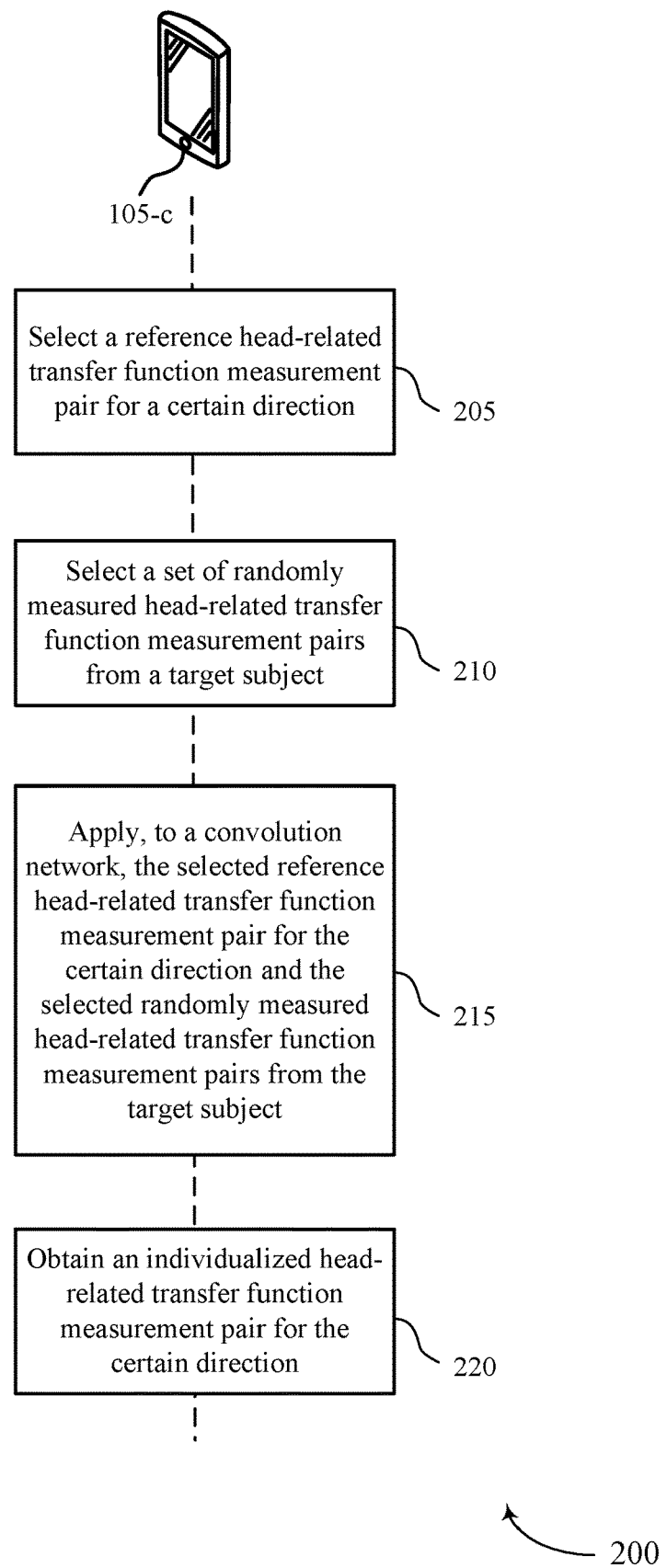
FIG. 2 illustrates an example of a process flow that supports head-related transfer function generation in accordance with aspects of the present disclosure.

FIG. 2 illustrates an example of a process flow 200 that supports head-related transfer function generation in accordance with aspects of the present disclosure. The operations of process flow 200 may be implemented by a device or its components as described herein. For example, the operations of process flow 200 may be performed by a device 105 or a head-related transfer function generation manager 135 as described with reference to FIG. 1. In some examples, a device 105-c may execute a set of instructions to control the functional elements of the device 105-c, as described with reference to FIG. 1, to perform the functions described below. Additionally or alternatively, the device 105-c may perform aspects of the functions described below using special-purpose hardware. Certain operations may also be left out of the process flow 200, or other operations may be added to the process flow 200.

At 205, the device 105-c may select a head-related transfer function measurement pair for a certain direction. For example, the device 105-c may select a head-related transfer function measurement pair for a certain direction from a head-related transfer function reference database. At 210, the device 105-c may select a set of randomly measured head-related transfer function measurement pair from a target subject (e.g., or per direction).

At 215, the device 105-c may apply, to a convolution network, the selected reference head-related transfer function measurement pair for the certain direction and the selected randomly measured head-related transfer function measurement pairs from the target subject. In some examples, the convolution network may be a style transfer operation. For example, one input to the style transfer operation may be a reference head-related transfer function measurement pair (e.g., to be used as a reference for content features also related to the certain direction). Another input to the style transfer operation may be the randomly measured head-related transfer function measurement pairs at a reception point (e.g., a target person). The content and style head-related transfer function measurement pair matrices may be concatenated. In some examples, an input size of the matrices may be small or large. However, because larger matrices are difficult for training, a single head-related transfer function measurement pair may be used as the content, e.g., we can estimate one direction for one time.

At 220, the device 105-c may obtain an individualized head-related transfer function measurement pair for the certain direction. For example, the device 105-c obtain an individualized head-related transfer function measurement pair for the certain direction based on an output of the convolution network. An L1 loss between an output head-related transfer function measurement pair and a base (reference) head-related transfer function may be determined. In some examples, a regularization term may be used, for example, individualization classification error and directional classification error to determine the L1 loss.

Figure 3:
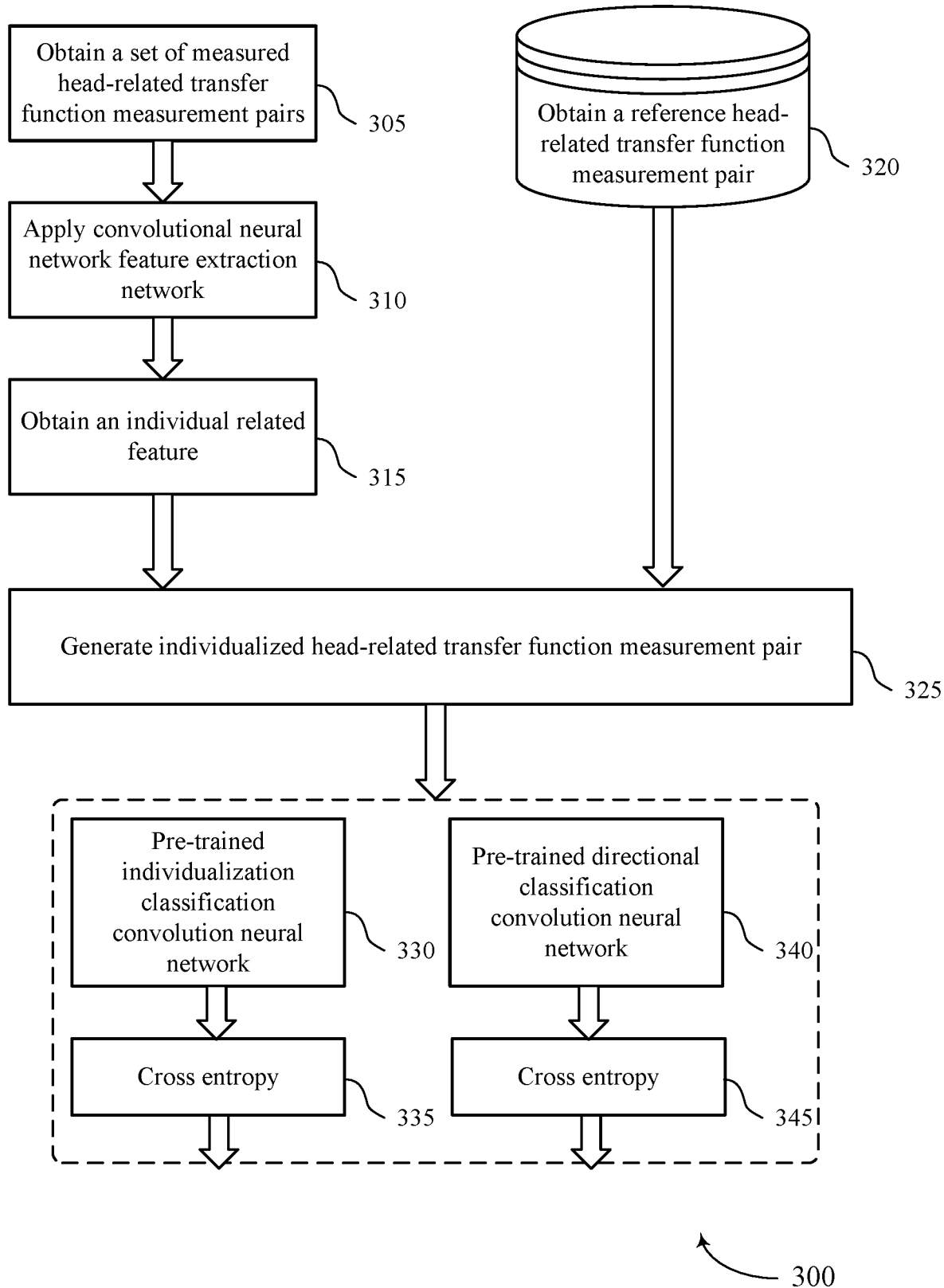
FIG. 3 illustrates an example of a pipeline that supports head-related transfer function generation in accordance with aspects of the present disclosure.

FIG. 3 illustrates an example of a pipeline 300 that supports head-related transfer function generation in accordance with aspects of the present disclosure. The operations of pipeline 300 may be implemented by a device or its components as described herein. For example, the operations of pipeline 300 may be implemented by a device 105 or a head-related transfer function generation manager 135 as described with reference to FIG. 1.

At 305 of the pipeline 300, a device 105 may obtain a set of measured head-related transfer function measurement pairs. At 310 of the pipeline 300, the device 105 may apply a convolutional neural network feature extraction network. For example, the device 105 may apply the convolutional neural network feature extraction network on the set of measured head-related transfer function measurement pairs. At 315 of the pipeline 300, the device 105 may obtain an individual related feature. For example, the individual related feature may be specific to a person. At 320 of the pipeline 300, the device 105 may obtain a reference head-related transfer function measurement pair, for example, from a head-related transfer function content database. For example, the device 105 may obtain a reference head-related transfer function measurement pair at a requested direction (e.g., angle) from a head-related transfer function content database. At 325 of the pipeline 300, the device 105 may generate an individualized head-related transfer function measurement pair. For example, the device 105 may generate the individualized head-related transfer function measurement pair based on the individual related feature and the reference head-related transfer function measurement pair at the requested direction.

In some examples, the pipeline 300 may optionally include a regularization scheme, which may help to avoid the generated head-related transfer function measurement data matching point-by-point to the head-related transfer function measurement input data. By doing so, the generation of head-related transfer function measurement data may be on unseen data, as well as preserving directional information and individual information. For example, at 330 of the pipeline 300, the device 105 may apply the generated head-related transfer function measurement pair on a pre-trained individualization classification convolutional neural network. At 335 of the pipeline 300, the device 105 may determine a cross entropy that may identify a true individual related feature associated with the head-related transfer function measurement pair. Additionally, or alternatively, at 340 of the pipeline 300, the device 105 may apply a pre-trained directional classification convolutional neural network. At 345 of the pipeline 300, the device 105 may determine a cross entropy that may identify a true directional related feature associated with the head-related transfer function measurement pair.

The pipeline 300 may provide improvements in head-related transfer function generation. Furthermore, the pipeline 300 may provide benefits and enhancements to the operation of the devices 105. For example, by supporting an efficient and effective pipeline 300 for head-related transfer function generation, the operational characteristics, such as power consumption, processor utilization (e.g., CPU processing utilization), and memory usage of the devices 105 may be reduced. The pipeline 300 may also provide efficiency to the devices 105 by reducing latency associated with processes related to head-related transfer function generation.

Figure 4:
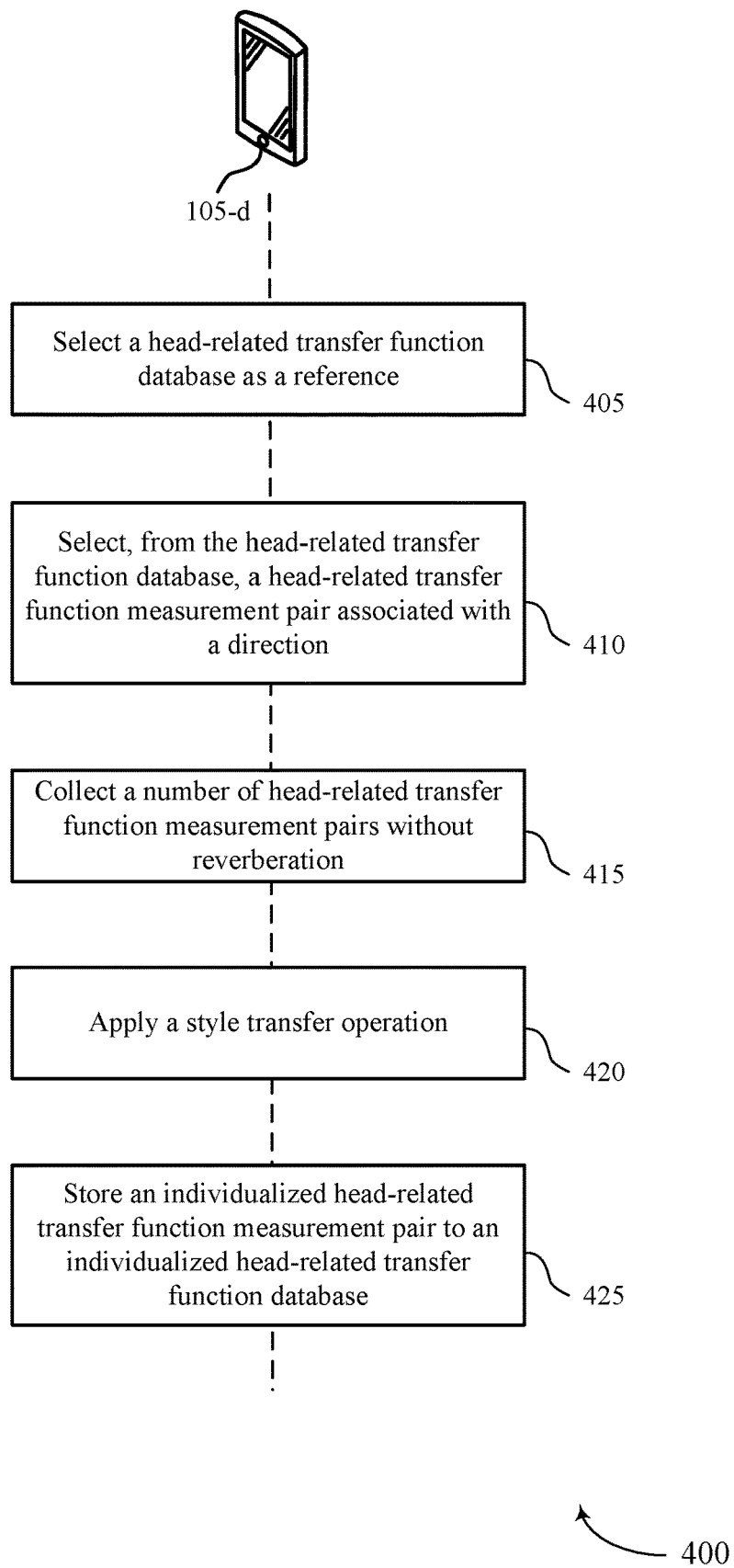
FIGS. 4 through 6 illustrate example of a process flow that supports head-related transfer function generation in accordance with aspects of the present disclosure.

FIG. 4 illustrates an example of a process flow 400 that supports head-related transfer function generation in accordance with aspects of the present disclosure. The operations of process flow 400 may be implemented by a device or its components as described herein. For example, the operations of process flow 400 may be performed by a device 105 or a head-related transfer function generation manager 135 as described with reference to FIG. 1. In some examples, a device 105-*d* may execute a set of instructions to control the functional elements of the device 105-*d*, as described with reference to FIG. 1, to perform the functions described below. Additionally or alternatively, the device 105-*d* may perform aspects of the functions described below using special-purpose hardware. Certain operations may also be left out of the process flow 400, or other operations may be added to the process flow 400.

At 405, the device 105-*d* may select a head-related transfer function database as a reference. At 410, the device 105-*d* may select, from the head-related transfer function database, a head-related transfer function measurement pair associated with a direction (e.g., or per direction). At 415, the device 105-*d* may collect a number of head-related transfer function measurement pairs without reverberation (e.g., transformations of a propagating sound wave including diffractions and reflections). At 420, the device 105-*d* may apply a style transfer operation. For example, one input to the style transfer operation may be a reference head-related transfer function measurement pair (e.g., to be used as a reference for content features also related to a certain direction). Another input to the style transfer operation may be the collected head-related transfer function measurement pairs with reverberation at a reception point (e.g., a subject). Therefore, the output of the style transfer operation may be an individualized head-related transfer function measurement. At 425, the device 105-*d* may store an individualized head-related transfer function measurement pair to an individualized head-related transfer function database.

Figure 5:
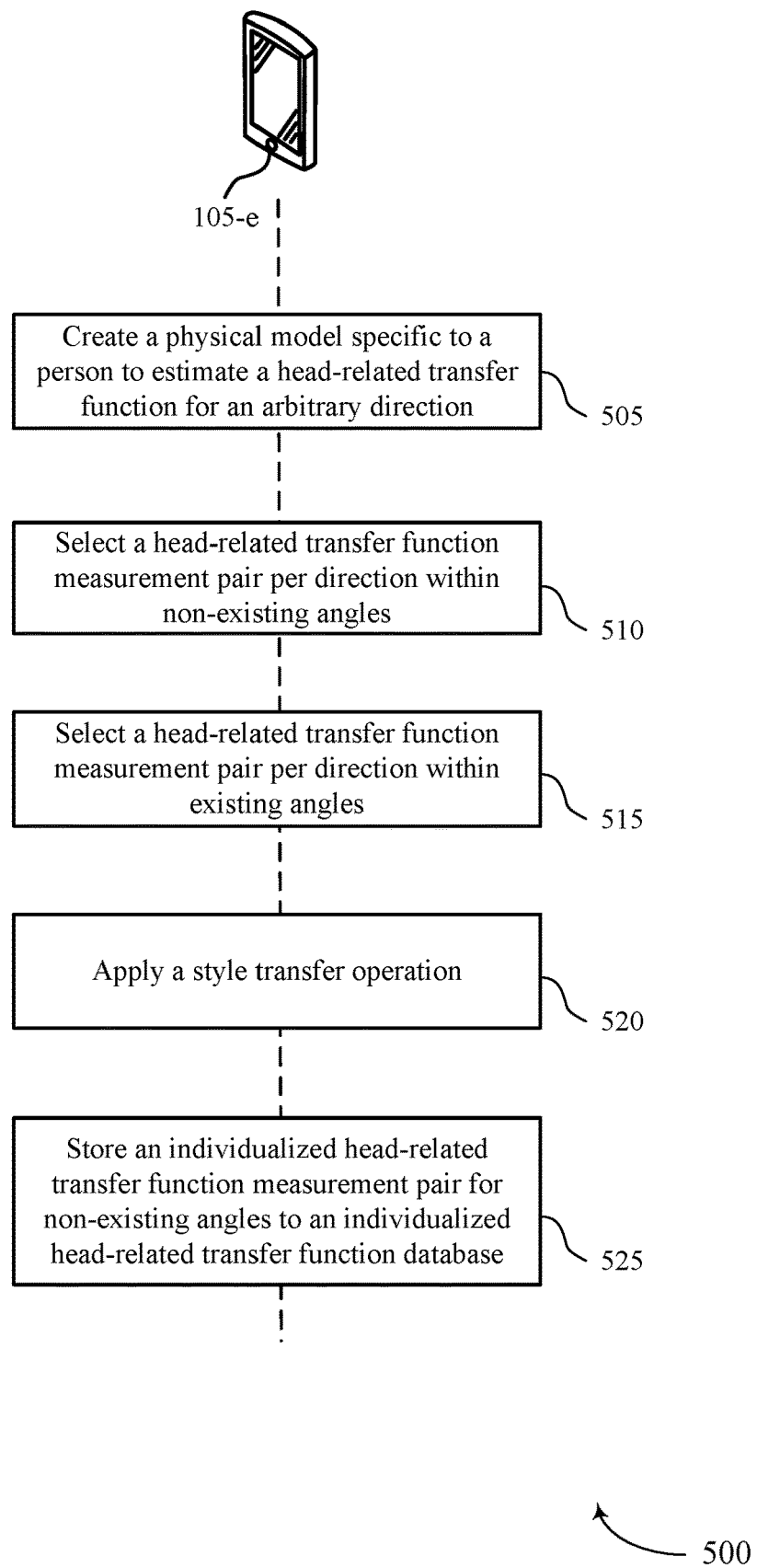

FIG. 5 illustrates an example of a process flow 500 that supports head-related transfer function generation in accordance with aspects of the present disclosure. The operations of process flow 500 may be implemented by a device or its components as described herein. For example, the operations of process flow 500 may be performed by a device 105 or a head-related transfer function generation manager 135 as described with reference to FIG. 1. In some examples, a device 105-*e* may execute a set of instructions to control the functional elements of the device 105-*e*, as described with reference to FIG. 1, to perform the functions described below. Additionally or alternatively, the device 105-*e* may perform aspects of the functions described below using special-purpose hardware. Certain operations may also be left out of the process flow 500, or other operations may be added to the process flow 500.

At 505, the device 105-*e* may create a physical model (e.g., head-and-torso+ear model) specific to a person to estimate a head-related transfer function for an arbitrary direction. The physical model may, in some examples, include using a dummy-head to measure dense directions (e.g., a range of angles having a threshold separation between each other). At 510, the device 105-*e* may select a head-related transfer function measurement pair per direction within non-existing angles. At 515, the device 105-*e* may select a head-related transfer function measurement pair per direction within existing angles. At 520, the device 105-*e* may apply a style transfer operation. For example, one input to the style transfer operation may be a head-related transfer function measurement pair within a non-existing angle (e.g., to be used as a reference for content features). Another input to the style transfer operation may be a head-related transfer function measurement pair within an existing angle. Therefore, the output of the style transfer operation may be an individualized head-related transfer function measurement pair. That is, the output of the style transfer operation may be an estimated individualized head-related transfer function measurement pair for a non-existing angle.

In some examples, the device 105-*e* may alternatively use a generative model to determine the individualized head-related transfer function measurement pair. A generative model also referred to as a generative adversarial network may be a class of artificial intelligence techniques used in machine learning. The generative model may include a training phase where the generative model collects a set of head-related transfer function measurement pairs (e.g., head-related transfer function measurement pairs within a non-existing angles, head-related transfer function measurement pairs within a existing angles) and then trains a model to generate data like it (e.g., individualized head-related transfer function measurement pairs). At 525, the device 105-*e* may store an individualized head-related transfer function measurement pair to an individualized head-related transfer function database.

Figure 6:
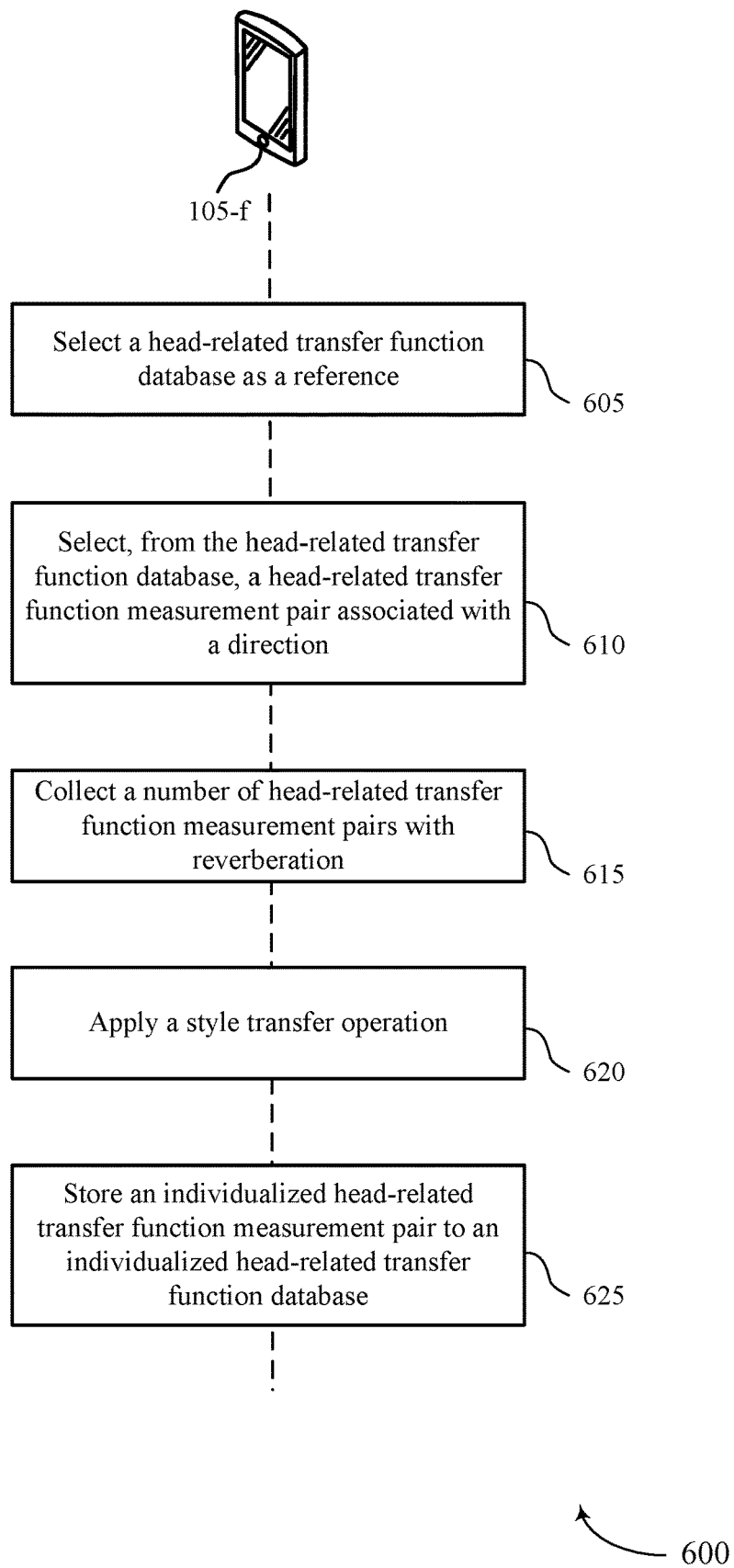

FIG. 6 illustrates an example of a process flow 600 that supports head-related transfer function generation in accordance with aspects of the present disclosure. The operations of process flow 600 may be implemented by a device or its components as described herein. For example, the operations of process flow 600 may be performed by a device 105 or a head-related transfer function generation manager 135 as described with reference to FIG. 1. In some examples, a device 105-*f* may execute a set of instructions to control the functional elements of the device 105-*f*, as described with reference to FIG. 1, to perform the functions described below. Additionally or alternatively, the device 105-f may perform aspects of the functions described below using special-purpose hardware. Certain operations may also be left out of the process flow 600, or other operations may be added to the process flow 600.

At 605, the device 105-f may select a head-related transfer function database as a reference. At 610, the device 105-f may select, from the head-related transfer function database, a head-related transfer function measurement pair associated with a direction (e.g., or per direction). At 615, the device 105-f may collect a number of head-related transfer function measurement pairs with reverberation (e.g., transformations of a propagating sound wave including diffractions and reflections). For example, the device 105-f may collect a number of head-related transfer function measurements with reverberation, where the head-related transfer function measurements are associated with a person.

At 620, the device 105-f may apply a style transfer operation. For example, one input to the style transfer operation may be a reference head-related transfer function measurement pair (e.g., to be used as a reference for content features also related to a certain direction). Another input to the style transfer operation may be the collected head-related transfer function measurement pairs with reverberation at a reception point (e.g., a subject). Therefore, the output of the style transfer operation may be an individualized head-related transfer function measurement. At 625, the device 105-f may store an individualized head-related transfer function measurement pair to an individualized head-related transfer function database.

Figure 7:
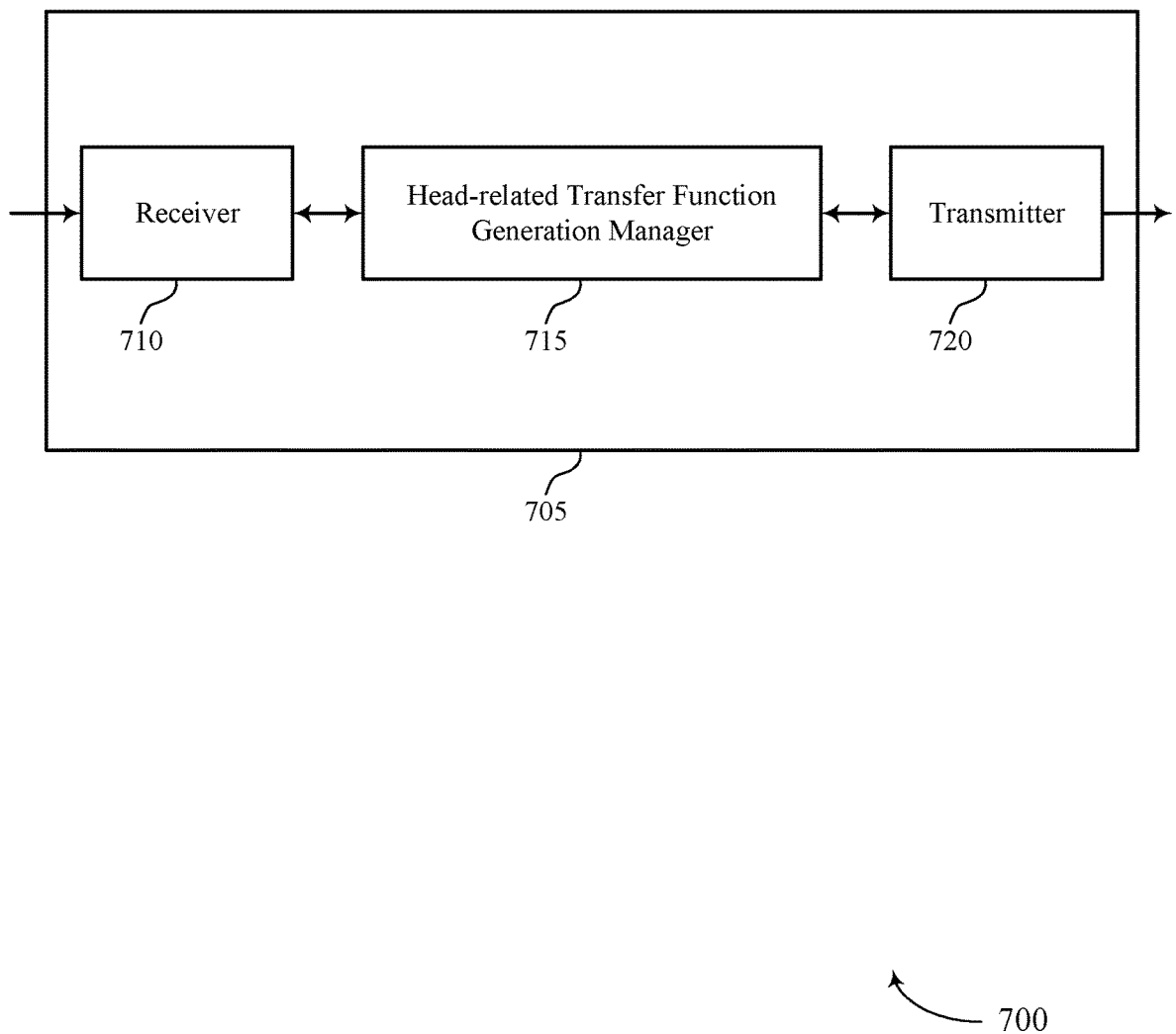
FIGS. 7 and 8 show block diagrams of devices that support head-related transfer function generation in accordance with aspects of the present disclosure.

FIG. 7 shows a block diagram 700 of a device 705 that supports head-related transfer function generation in accordance with aspects of the present disclosure. The device 705 may be an example of aspects of a device as described herein. The device 705 may include a receiver 710, a head-related transfer function generation manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to head-related transfer function generation, etc.). Information may be passed on to other components of the device 705. The receiver 710 may be an example of aspects of the transceiver 1020 described with reference to FIG. 10. The receiver 710 may utilize a single antenna or a set of antennas.

The head-related transfer function generation manager 715 may receive a digital representation of a first audio signal associated with a location relative to a subject, output a second audio signal based on the digital representation of the first audio signal and the second head-related transfer function measurement pair, select from a database a first reference head-related transfer function measurement pair corresponding to the location of the first audio signal, and obtain a second head-related transfer function measurement pair by performing a style transfer operation on the selected reference head-related transfer function measurement pair based on a set of head-related transfer function measurement pairs specific to the subject. The head-related transfer function generation manager 715 may be an example of aspects of the head-related transfer function generation manager 1010 described herein.

The head-related transfer function generation manager 715, or its sub-components, may be implemented in hardware, code (e.g., software or firmware) executed by a processor, or any combination thereof. If implemented in code executed by a processor, the functions of the head-related transfer function generation manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The head-related transfer function generation manager 715, or its sub-components, may be physically located at various positions, including being distributed such that portions of functions are implemented at different physical locations by one or more physical components. In some examples, the head-related transfer function generation manager 715, or its sub-components, may be a separate and distinct component in accordance with various aspects of the present disclosure. In some examples, the head-related transfer function generation manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
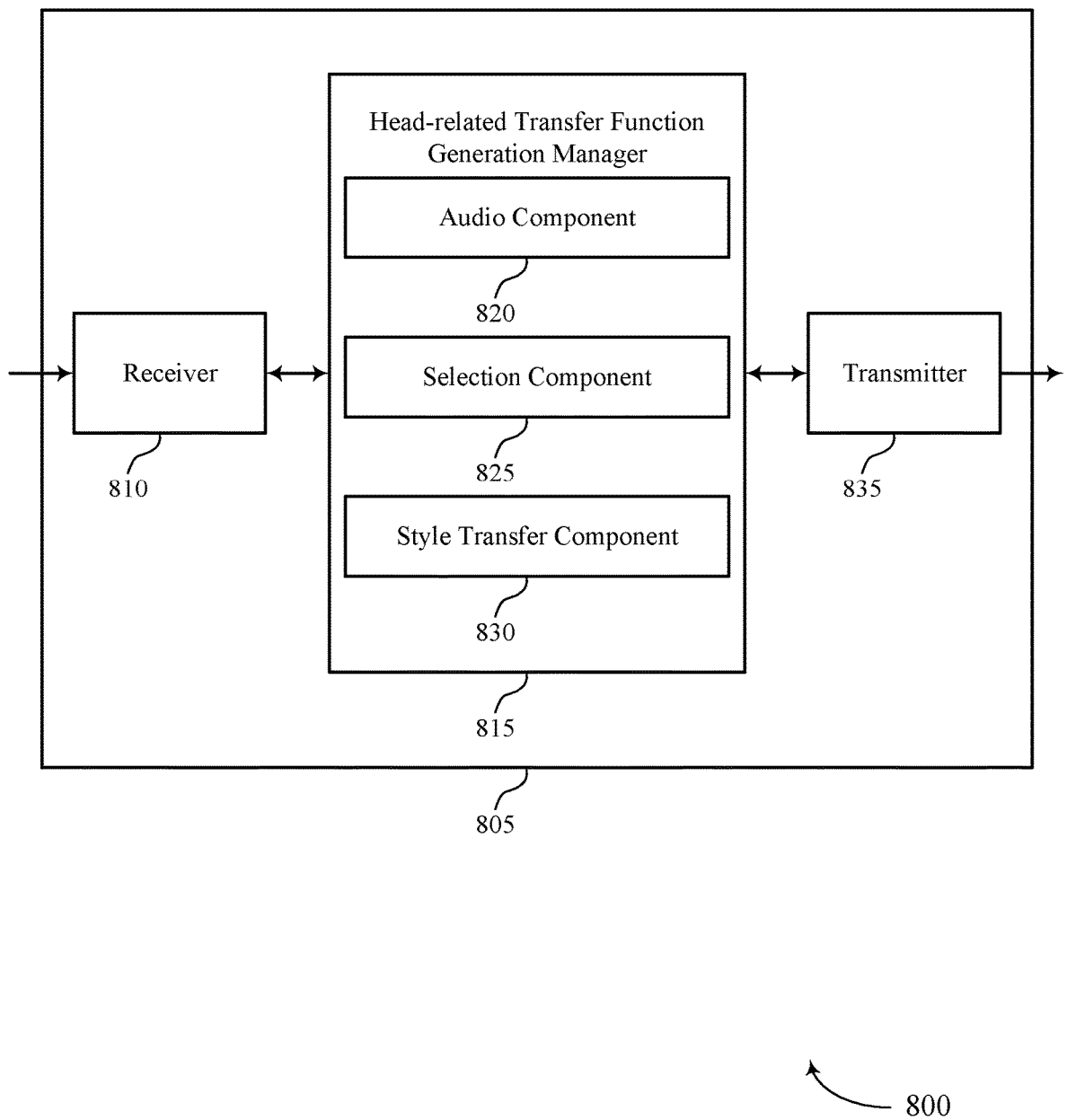

FIG. 8 shows a block diagram 800 of a device 805 that supports head-related transfer function generation in accordance with aspects of the present disclosure. The device 805 may be an example of aspects of a device 705 or a device 115 as described herein. The device 805 may include a receiver 810, a head-related transfer function generation manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to head-related transfer function generation, etc.). Information may be passed on to other components of the device 805. The receiver 810 may be an example of aspects of the transceiver 1020 described with reference to FIG. 10. The receiver 810 may utilize a single antenna or a set of antennas.

The head-related transfer function generation manager 815 may be an example of aspects of the head-related transfer function generation manager 715 as described herein. The head-related transfer function generation manager 815 may include an audio component 820, a selection component 825, and a style transfer component 830. The head-related transfer function generation manager 815 may be an example of aspects of the head-related transfer function generation manager 1010 described herein.

The audio component 820 may receive a digital representation of a first audio signal associated with a location relative to a subject and output a second audio signal based on the digital representation of the first audio signal and a second head-related transfer function measurement pair. The selection component 825 may select from a database a first reference head-related transfer function measurement pair corresponding to the location of the first audio signal. The style transfer component 830 may obtain the second head-related transfer function measurement pair by performing a style transfer operation on the selected reference head-related transfer function measurement pair based on a set of head-related transfer function measurement pairs specific to the subject.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
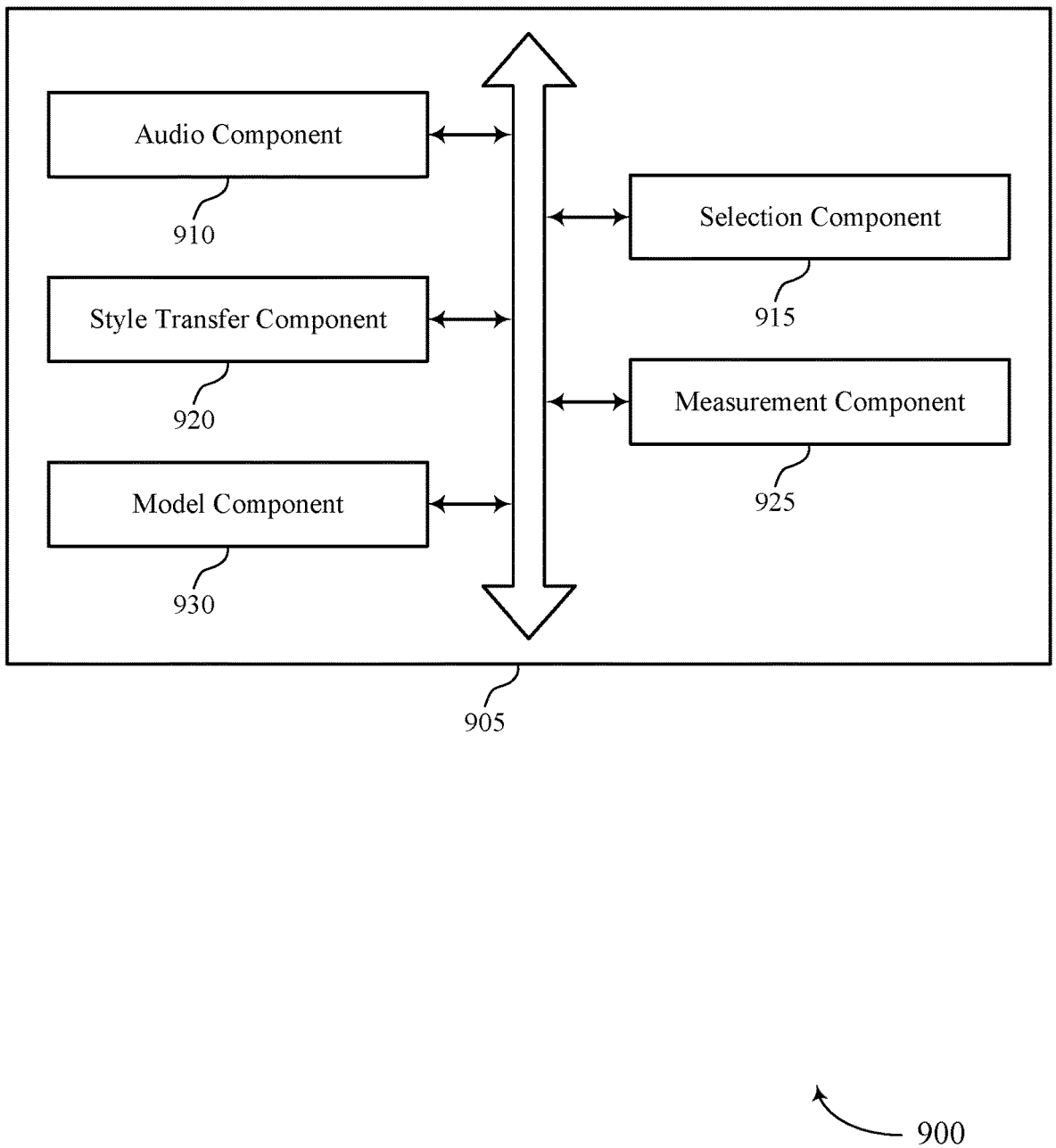
FIG. 9 shows a block diagram of a head-related transfer function generation manager that supports head-related transfer function generation in accordance with aspects of the present disclosure.

FIG. 9 shows a block diagram 900 of a head-related transfer function generation manager 905 that supports head-related transfer function generation in accordance with aspects of the present disclosure. The head-related transfer function generation manager 905 may be an example of aspects of a head-related transfer function generation manager 715, a head-related transfer function generation manager 815, or a head-related transfer function generation manager 1010 described herein. The head-related transfer function generation manager 905 may include an audio component 910, a selection component 915, a style transfer component 920, a measurement component 925, and a model component 930. Each of these modules may communicate, directly or indirectly, with one another (e.g., via one or more buses).

The audio component 910 may receive a digital representation of a first audio signal associated with a location relative to a subject. In some examples, the audio component 910 may output a second audio signal based on the digital representation of the first audio signal and a second head-related transfer function measurement pair.

The selection component 915 may select from a database a first reference head-related transfer function measurement pair corresponding to the location of the first audio signal. In some examples, the selection component 915 may determine the first reference head-related transfer function measurement pair in the database satisfies a threshold match value, where selecting from the database the first reference head-related transfer function measurement pair is based on the threshold match value.

The style transfer component 920 may obtain the second head-related transfer function measurement pair by performing a style transfer operation on the selected reference head-related transfer function measurement pair based on a set of head-related transfer function measurement pairs specific to the subject. In some examples, the style transfer component 920 may determine an estimated head-related transfer function measurement pair for the non-existing angle specific to the subject by performing the style transfer operation on the first head-related transfer function measurement pair and the second head-related transfer function measurement pair. In some examples, the style transfer component 920 may obtain a third head-related transfer function measurement pair by performing a regularization on the second head-related transfer function measurement pair, where outputting the second audio signal based on the digital representation of the first audio signal and the third head-related transfer function measurement pair.

The measurement component 925 may measure a set of head-related impulse responses associated with a training audio signal. In some examples, the measurement component 925 may determine the set of head-related transfer function measurement pairs specific to the subject using a deep learning scheme on the set of head-related impulse responses. In some examples, the measurement component 925 may store in the database the set of head-related transfer function measurement pairs specific to the subject. In some examples, the measurement component 925 may measure a set of reverberation signals associated with the training audio signal, where determining the set of head-related transfer function measurement pairs specific to the subject is further based on using the deep learning scheme on the set of head-related impulse responses and the set of reverberation signals specific to the subject. In some examples, the measurement component 925 may measure a first head-related transfer function measurement pair for a first location from the set of locations using a non-existing angle. In some examples, the measurement component 925 may measure a second head-related transfer function measurement pair for the first location from the set of locations using an existing angle. In some cases, the deep learning scheme includes a convolutional neural network.

The model component 930 may generate a physical model specific to the subject to measure the set of head-related impulse responses associated with the training audio signal for a set of locations specific to the subject, where determining the set of head-related transfer function measurement pairs is further based on the physical model specific to the subject.

Figure 10:
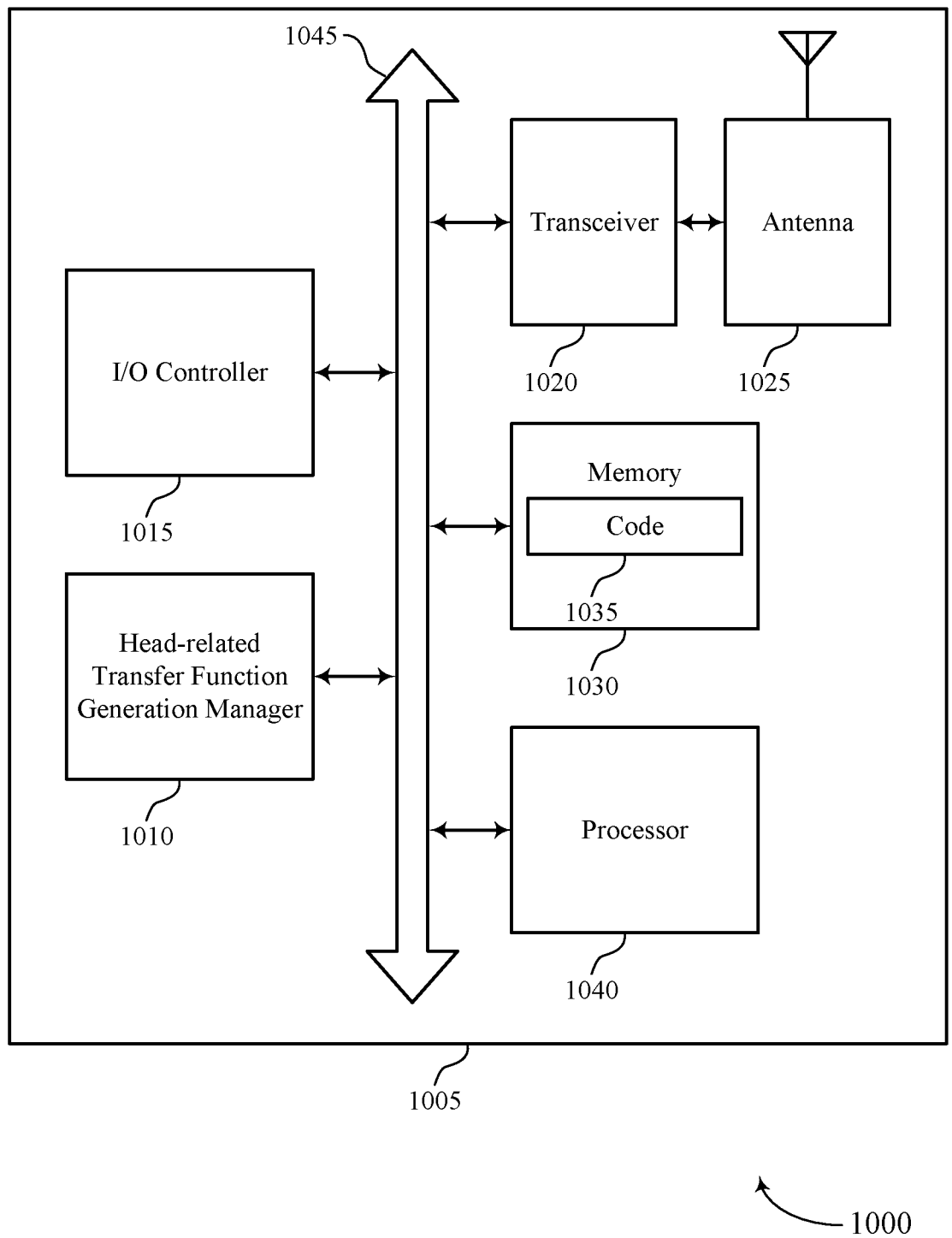
FIG. 10 shows a diagram of a system including a device that supports head-related transfer function generation in accordance with aspects of the present disclosure.

FIG. 10 shows a diagram of a system 1000 including a device 1005 that supports head-related transfer function generation in accordance with aspects of the present disclosure. The device 1005 may be an example of or include the components of device 705, device 805, or a device as described herein. The device 1005 may include components for bi-directional voice and data communications including components for transmitting and receiving communications, including a head-related transfer function generation manager 1010, an I/O controller 1015, a transceiver 1020, an antenna 1025, memory 1030, and a processor 1040. These components may be in electronic communication via one or more buses (e.g., bus 1045).

The head-related transfer function generation manager 1010 may receive a digital representation of a first audio signal associated with a location relative to a subject, output a second audio signal based on the digital representation of the first audio signal and the second head-related transfer function measurement pair, select from a database a first reference head-related transfer function measurement pair corresponding to the location of the first audio signal, and obtain a second head-related transfer function measurement pair by performing a style transfer operation on the selected reference head-related transfer function measurement pair based on a set of head-related transfer function measurement pairs specific to the subject.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS, ANDROID, MS-DOS, MS-WINDOWS, OS/2, UNIX, LINUX, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases the device 1005 may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The code 1035 may include instructions to implement aspects of the present disclosure, including instructions to support head-related transfer function generation. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting head-related transfer function generation).

Figure 11:
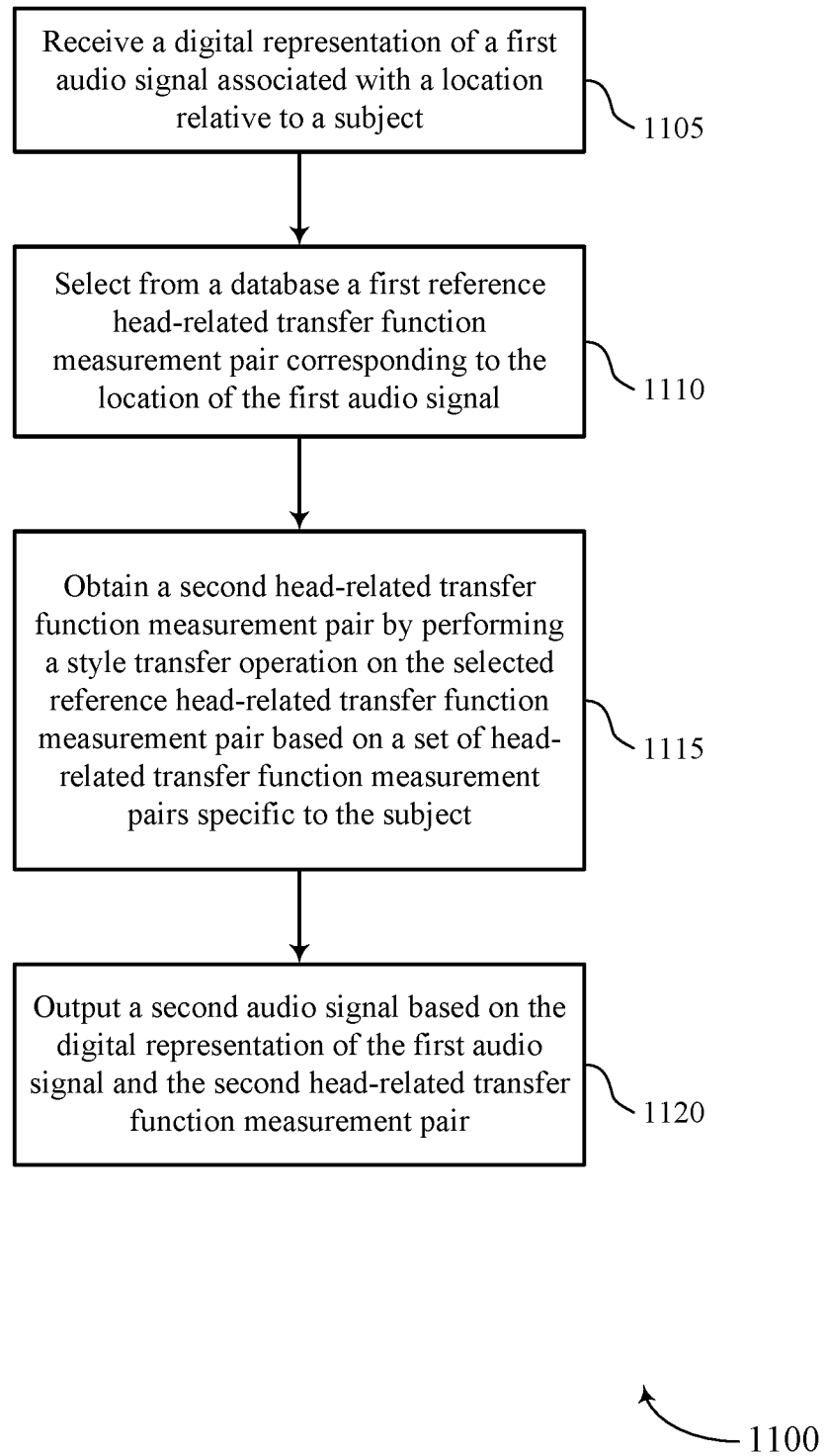
FIGS. 11 through 15 show flowcharts illustrating methods that support head-related transfer function generation in accordance with aspects of the present disclosure.

FIG. 11 shows a flowchart illustrating a method 1100 that supports head-related transfer function generation in accordance with aspects of the present disclosure. The operations of method 1100 may be implemented by a device or its components as described herein. For example, the operations of method 1100 may be performed by a head-related transfer function generation manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1105, the device may receive a digital representation of a first audio signal associated with a location relative to a subject. The operations of 1105 may be performed according to the methods described herein. In some examples, aspects of the operations of 1105 may be performed by an audio component as described with reference to FIGS. 7 through 10.

At 1110, the device may select from a database a first reference head-related transfer function measurement pair corresponding to the location of the first audio signal. The operations of 1110 may be performed according to the methods described herein. In some examples, aspects of the operations of 1110 may be performed by a selection component as described with reference to FIGS. 7 through 10.

At 1115, the device may obtain a second head-related transfer function measurement pair by performing a style transfer operation on the selected reference head-related transfer function measurement pair based on a set of head-related transfer function measurement pairs specific to the subject. The operations of 1115 may be performed according to the methods described herein. In some examples, aspects of the operations of 1115 may be performed by a style transfer component as described with reference to FIGS. 7 through 10.

At 1120, the device may output a second audio signal based on the digital representation of the first audio signal and the second head-related transfer function measurement pair. The operations of 1120 may be performed according to the methods described herein. In some examples, aspects of the operations of 1120 may be performed by an audio component as described with reference to FIGS. 7 through 10.

Figure 12:
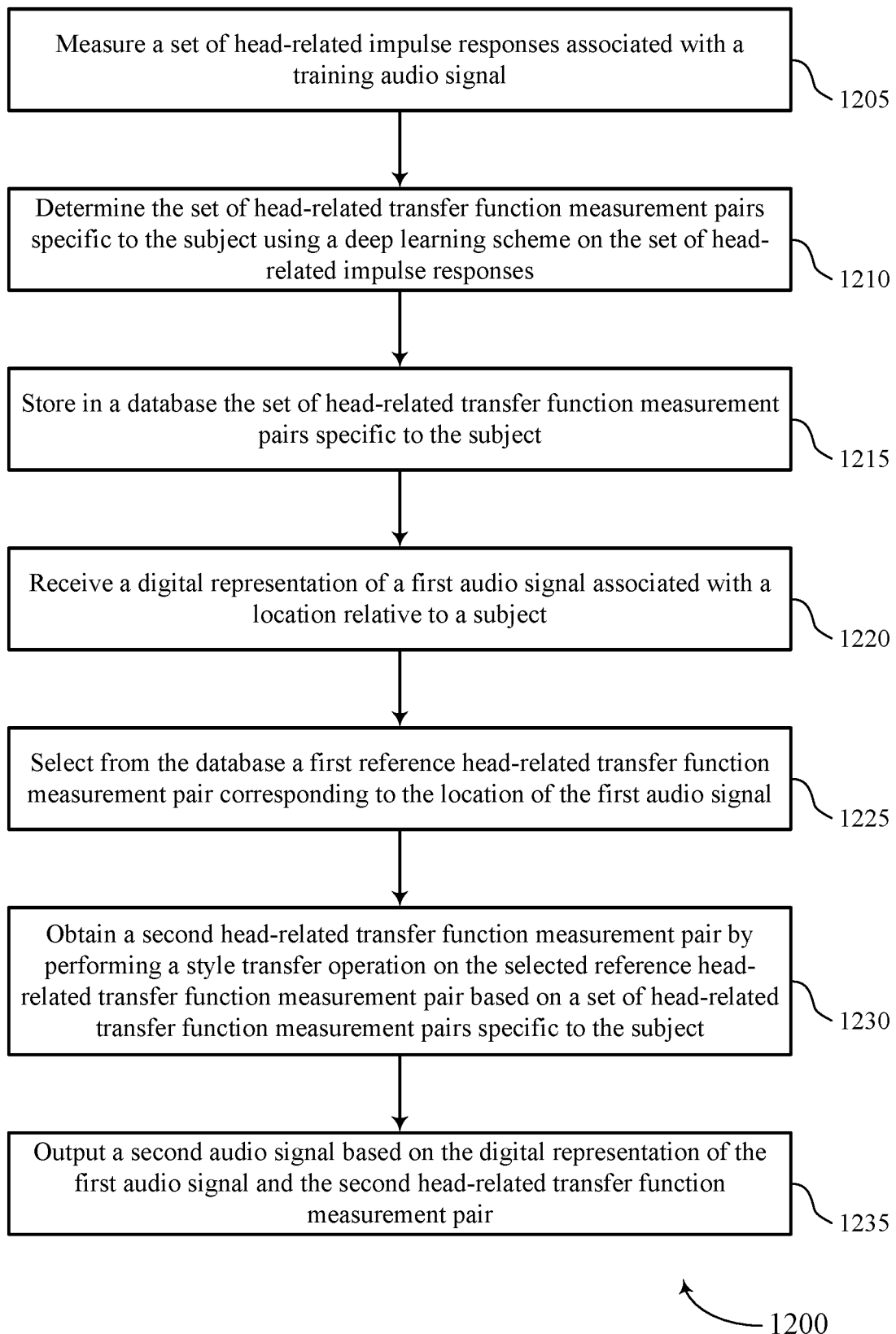

FIG. 12 shows a flowchart illustrating a method 1200 that supports head-related transfer function generation in accordance with aspects of the present disclosure. The operations of method 1200 may be implemented by a device or its components as described herein. For example, the operations of method 1200 may be performed by a head-related transfer function generation manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1205, the device may measure a set of head-related impulse responses associated with a training audio signal. The operations of 1205 may be performed according to the methods described herein. In some examples, aspects of the operations of 1205 may be performed by a measurement component as described with reference to FIGS. 7 through 10.

At 1210, the device may determine the set of head-related transfer function measurement pairs specific to the subject using a deep learning scheme on the set of head-related impulse responses. The operations of 1210 may be performed according to the methods described herein. In some examples, aspects of the operations of 1210 may be performed by a measurement component as described with reference to FIGS. 7 through 10.

At 1215, the device may store in a database the set of head-related transfer function measurement pairs specific to the subject. The operations of 1215 may be performed according to the methods described herein. In some examples, aspects of the operations of 1215 may be performed by a measurement component as described with reference to FIGS. 7 through 10.

At 1220, the device may receive a digital representation of a first audio signal associated with a location relative to a subject. The operations of 1220 may be performed according to the methods described herein. In some examples, aspects of the operations of 1220 may be performed by an audio component as described with reference to FIGS. 7 through 10.

At 1225, the device may select from the database a first reference head-related transfer function measurement pair corresponding to the location of the first audio signal. The operations of 1225 may be performed according to the methods described herein. In some examples, aspects of the operations of 1225 may be performed by a selection component as described with reference to FIGS. 7 through 10.

At 1230, the device may obtain a second head-related transfer function measurement pair by performing a style transfer operation on the selected reference head-related transfer function measurement pair based on a set of head-related transfer function measurement pairs specific to the subject. The operations of 1230 may be performed according to the methods described herein. In some examples, aspects of the operations of 1230 may be performed by a style transfer component as described with reference to FIGS. 7 through 10.

At 1235, the device may output a second audio signal based on the digital representation of the first audio signal and the second head-related transfer function measurement pair. The operations of 1235 may be performed according to the methods described herein. In some examples, aspects of the operations of 1235 may be performed by an audio component as described with reference to FIGS. 7 through 10.

Figure 13:
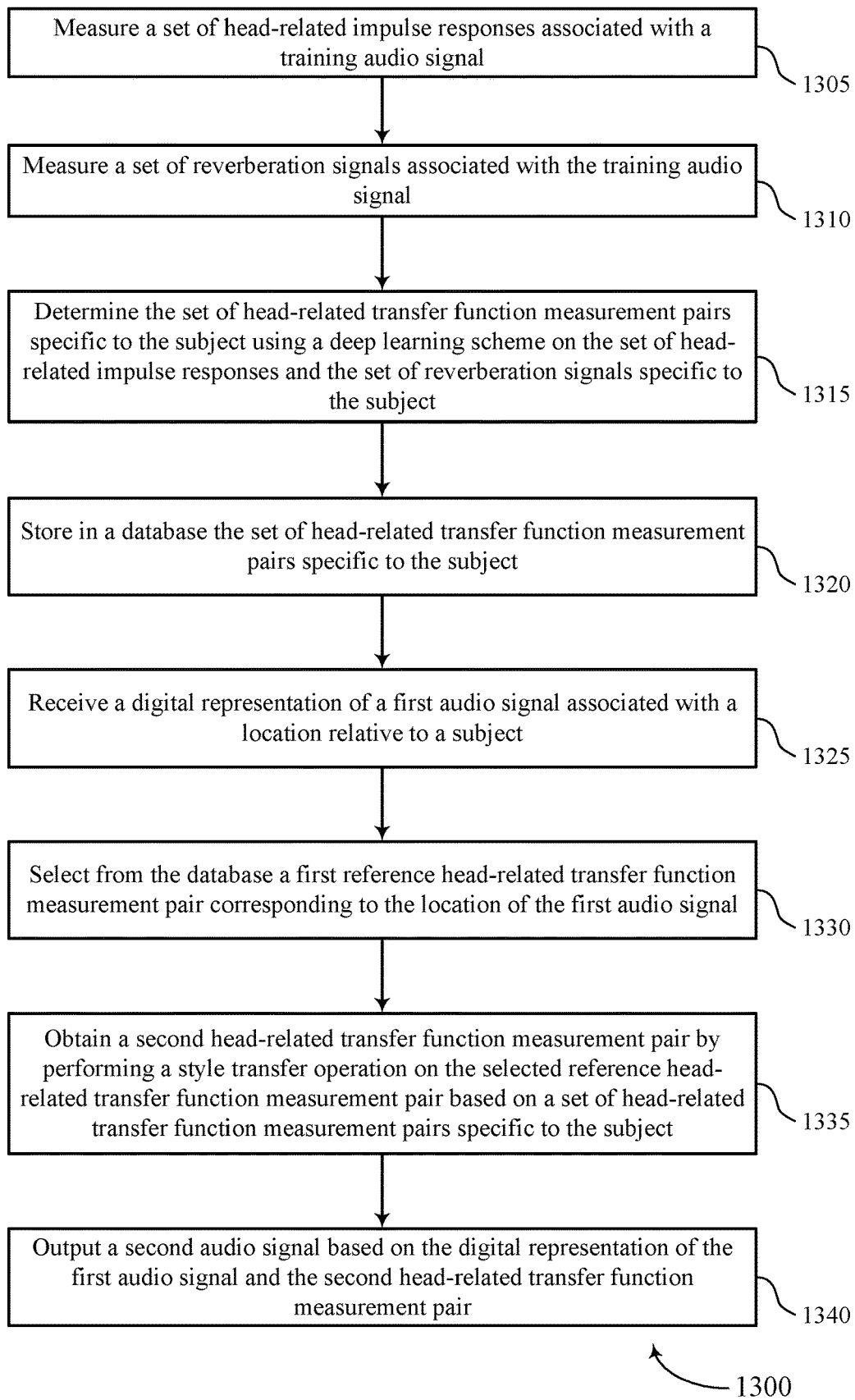

FIG. 13 shows a flowchart illustrating a method 1300 that supports head-related transfer function generation in accordance with aspects of the present disclosure. The operations of method 1300 may be implemented by a device or its components as described herein. For example, the operations of method 1300 may be performed by a head-related transfer function generation manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1305, the device may measure a set of head-related impulse responses associated with a training audio signal. The operations of 1305 may be performed according to the methods described herein. In some examples, aspects of the operations of 1305 may be performed by a measurement component as described with reference to FIGS. 7 through 10.

At 1310, the device may measure a set of reverberation signals associated with the training audio signal. The operations of 1310 may be performed according to the methods described herein. In some examples, aspects of the operations of 1310 may be performed by a measurement component as described with reference to FIGS. 7 through 10.

At 1315, the device may determine the set of head-related transfer function measurement pairs specific to the subject using a deep learning scheme on the set of head-related impulse responses and the set of reverberation signals specific to the subject. The operations of 1315 may be performed according to the methods described herein. In some examples, aspects of the operations of 1315 may be performed by a measurement component as described with reference to FIGS. 7 through 10.

At 1320, the device may store in a database the set of head-related transfer function measurement pairs specific to the subject. The operations of 1320 may be performed according to the methods described herein. In some examples, aspects of the operations of 1320 may be performed by a measurement component as described with reference to FIGS. 7 through 10.

At 1325, the device may receive a digital representation of a first audio signal associated with a location relative to a subject. The operations of 1325 may be performed according to the methods described herein. In some examples, aspects of the operations of 1325 may be performed by an audio component as described with reference to FIGS. 7 through 10.

At 1330, the device may select from the database a first reference head-related transfer function measurement pair corresponding to the location of the first audio signal. The operations of 1330 may be performed according to the methods described herein. In some examples, aspects of the operations of 1330 may be performed by a selection component as described with reference to FIGS. 7 through 10.

At 1335, the device may obtain a second head-related transfer function measurement pair by performing a style transfer operation on the selected reference head-related transfer function measurement pair based on a set of head-related transfer function measurement pairs specific to the subject. The operations of 1335 may be performed according to the methods described herein. In some examples, aspects of the operations of 1335 may be performed by a style transfer component as described with reference to FIGS. 7 through 10.

At 1340, the device may output a second audio signal based on the digital representation of the first audio signal and the second head-related transfer function measurement pair. The operations of 1340 may be performed according to the methods described herein. In some examples, aspects of the operations of 1340 may be performed by an audio component as described with reference to FIGS. 7 through 10.

Figure 14:
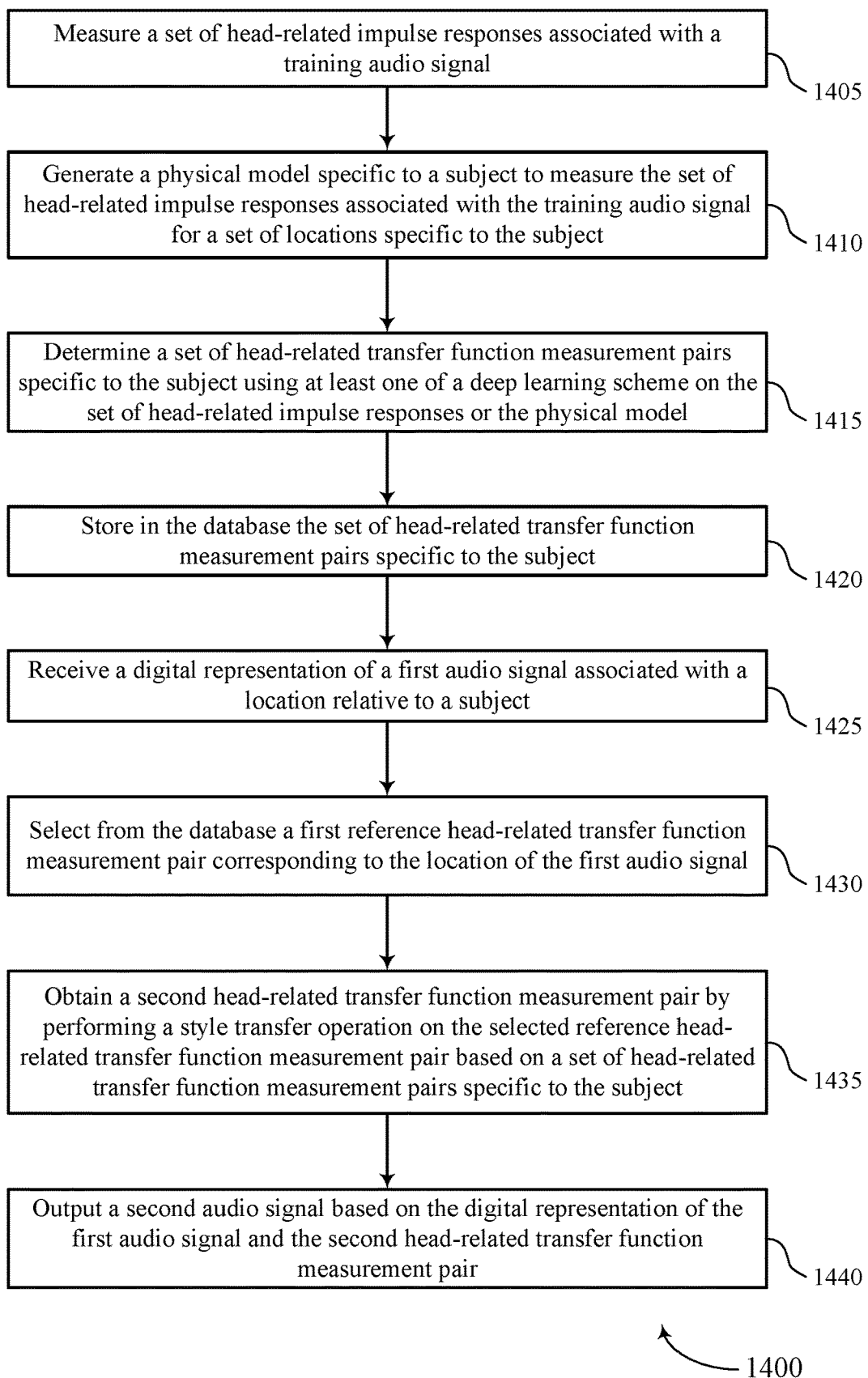

FIG. 14 shows a flowchart illustrating a method 1400 that supports head-related transfer function generation in accordance with aspects of the present disclosure. The operations of method 1400 may be implemented by a device or its components as described herein. For example, the operations of method 1400 may be performed by a head-related transfer function generation manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1405, the device may measure a set of head-related impulse responses associated with a training audio signal. The operations of 1405 may be performed according to the methods described herein. In some examples, aspects of the operations of 1405 may be performed by a measurement component as described with reference to FIGS. 7 through 10.

At 1410, the device may generate a physical model specific to a subject to measure the set of head-related impulse responses associated with the training audio signal for a set of locations specific to the subject. The operations of 1410 may be performed according to the methods described herein. In some examples, aspects of the operations of 1410 may be performed by a model component as described with reference to FIGS. 7 through 10.

At 1415, the device may determine a set of head-related transfer function measurement pairs specific to the subject using at least one of a deep learning scheme on the set of head-related impulse responses or the physical model. The operations of 1415 may be performed according to the methods described herein. In some examples, aspects of the operations of 1415 may be performed by a measurement component as described with reference to FIGS. 7 through 10.

At 1420, the device may store in the database the set of head-related transfer function measurement pairs specific to the subject. The operations of 1420 may be performed according to the methods described herein. In some examples, aspects of the operations of 1420 may be performed by a measurement component as described with reference to FIGS. 7 through 10.

At 1425, the device may receive a digital representation of a first audio signal associated with a location relative to a subject. The operations of 1425 may be performed according to the methods described herein. In some examples, aspects of the operations of 1425 may be performed by an audio component as described with reference to FIGS. 7 through 10.

At 1430, the device may select from the database a first reference head-related transfer function measurement pair corresponding to the location of the first audio signal. The operations of 1430 may be performed according to the methods described herein. In some examples, aspects of the operations of 1430 may be performed by a selection component as described with reference to FIGS. 7 through 10.

At 1435, the device may obtain a second head-related transfer function measurement pair by performing a style transfer operation on the selected reference head-related transfer function measurement pair based on a set of head-related transfer function measurement pairs specific to the subject. The operations of 1435 may be performed according to the methods described herein. In some examples, aspects of the operations of 1435 may be performed by a style transfer component as described with reference to FIGS. 7 through 10.

At 1440, the device may output a second audio signal based on the digital representation of the first audio signal and the second head-related transfer function measurement pair. The operations of 1440 may be performed according to the methods described herein. In some examples, aspects of the operations of 1440 may be performed by an audio component as described with reference to FIGS. 7 through 10.

Figure 15:
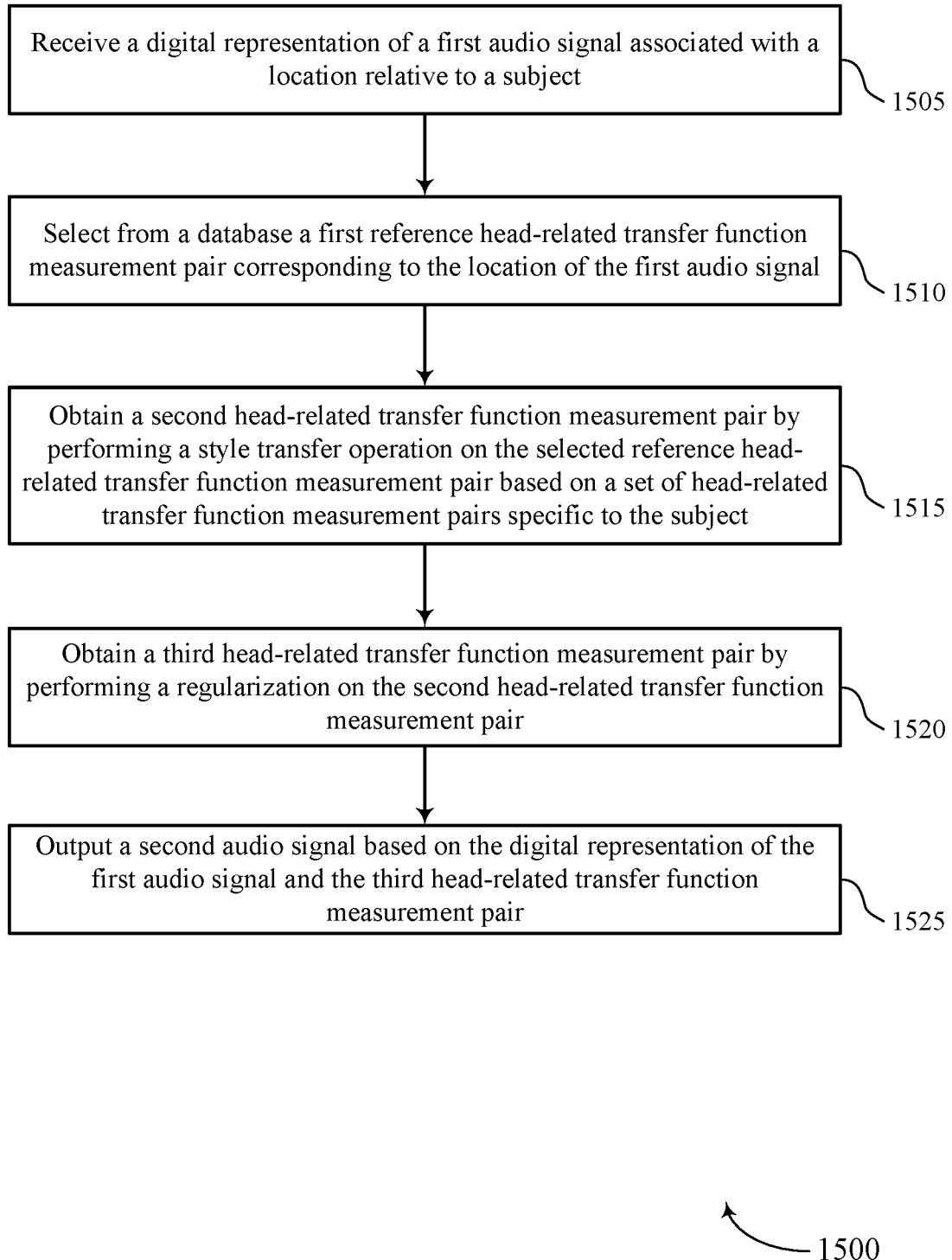

FIG. 15 shows a flowchart illustrating a method 1500 that supports head-related transfer function generation in accordance with aspects of the present disclosure. The operations of method 1500 may be implemented by a device or its components as described herein. For example, the operations of method 1500 may be performed by a head-related transfer function generation manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1505, the device may receive a digital representation of a first audio signal associated with a location relative to a subject. The operations of 1505 may be performed according to the methods described herein. In some examples, aspects of the operations of 1505 may be performed by an audio component as described with reference to FIGS. 7 through 10.

At 1510, the device may select from a database a first reference head-related transfer function measurement pair corresponding to the location of the first audio signal. The operations of 1510 may be performed according to the methods described herein. In some examples, aspects of the operations of 1510 may be performed by a selection component as described with reference to FIGS. 7 through 10.

At 1515, the device may obtain a second head-related transfer function measurement pair by performing a style transfer operation on the selected reference head-related transfer function measurement pair based on a set of head-related transfer function measurement pairs specific to the subject. The operations of 1515 may be performed according to the methods described herein. In some examples, aspects of the operations of 1515 may be performed by a style transfer component as described with reference to FIGS. 7 through 10.

At 1520, the device may obtain a third head-related transfer function measurement pair by performing a regularization on the second head-related transfer function measurement pair. The operations of 1520 may be performed according to the methods described herein. In some examples, aspects of the operations of 1520 may be performed by a style transfer component as described with reference to FIGS. 7 through 10.

At 1525, the device may output a second audio signal based on the digital representation of the first audio signal and the third head-related transfer function measurement pair. The operations of 1525 may be performed according to the methods described herein. In some examples, aspects of the operations of 1525 may be performed by an audio component as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving a digital representation of a first audio signal associated with a location relative to a subject;
   determining that a first reference head-related transfer function measurement pair in a database satisfies a threshold match value corresponding to content features or style features, or both, associated with the first audio signal;
   selecting from the database the first reference head-related transfer function measurement pair corresponding to the location of the first audio signal based at least in part on the determining;
   obtaining a second head-related transfer function measurement pair by performing a style transfer operation on the selected reference head-related transfer function measurement pair based at least in part on a plurality of head-related transfer function measurement pairs specific to the subject, the style transfer operation comprising content features associated with the first reference head-related transfer function measurement pair combined with style features associated with at least one head-related transfer function measurement pair of the plurality of head-related transfer function measurement pairs specific to the subject; and
   outputting a second audio signal based at least in part on the digital representation of the first audio signal and the second head-related transfer function measurement pair.

2. The method of claim 1,
   wherein selecting from the database the first reference head-related transfer function measurement pair is based at least in part on the threshold match value.

3. The method of claim 1, further comprising:
   measuring a plurality of head-related impulse responses associated with a training audio signal;
   determining the plurality of head-related transfer function measurement pairs specific to the subject using a deep learning scheme on the plurality of head-related impulse responses; and
   storing in the database the plurality of head-related transfer function measurement pairs specific to the subject.

4. The method of claim 3, further comprising:
   measuring a plurality of reverberation signals associated with the training audio signal,
   wherein determining the plurality of head-related transfer function measurement pairs specific to the subject is further based at least in part on using the deep learning scheme on the plurality of head-related impulse responses and the plurality of reverberation signals specific to the subject.

5. The method of claim 3, wherein the deep learning scheme comprises a convolutional neural network.

6. The method of claim 3, further comprising:
   generating a physical model specific to the subject to measure the plurality of head-related impulse responses associated with the training audio signal for a set of locations specific to the subject, wherein determining the plurality of head-related transfer function measurement pairs is further based at least in part on the physical model specific to the subject.

7. The method of claim 6, further comprising:
measuring a first head-related transfer function measurement pair for a first location from the set of locations using a first angle;
measuring a second head-related transfer function measurement pair for the first location from the set of locations using a second angle that is different from the first angle; and
determining an estimated head-related transfer function measurement pair for the first angle specific to the subject by performing the style transfer operation on the first head-related transfer function measurement pair and the second head-related transfer function measurement pair.

8. The method of claim 1, further comprising:
obtaining a third head-related transfer function measurement pair by performing a regularization on the second head-related transfer function measurement pair,
wherein outputting the second audio signal based at least in part on the digital representation of the first audio signal and the third head-related transfer function measurement pair.

9. An apparatus, comprising:
a processor,
memory in electronic communication with the processor; and
instructions stored in the memory and executable by the processor to cause the apparatus to:
receive a digital representation of a first audio signal associated with a location relative to a subject;
determine that a first reference head-related transfer function measurement pair in a database satisfies a threshold match value corresponding to content features or style features, or both, associated with the first audio signal;
select from the database the first reference head-related transfer function measurement pair corresponding to the location of the first audio signal based at least in part on the determining;
obtain a second head-related transfer function measurement pair by performing a style transfer operation on the selected reference head-related transfer function measurement pair based at least in part on a plurality of head-related transfer function measurement pairs specific to the subject, the style transfer operation comprising content features associated with the first reference head-related transfer function measurement pair combined with style features associated with at least one head-related transfer function measurement pair of the plurality of head-related transfer function measurement pairs specific to the subject; and
output a second audio signal based at least in part on the digital representation of the first audio signal and the second head-related transfer function measurement pair.

10. The apparatus of claim 9,
wherein selecting from the database the first reference head-related transfer function measurement pair is based at least in part on the threshold match value.

11. The apparatus of claim 9, wherein the instructions are further executable by the processor to cause the apparatus to:
measure a plurality of head-related impulse responses associated with a training audio signal;
determine the plurality of head-related transfer function measurement pairs specific to the subject using a deep learning scheme on the plurality of head-related impulse responses; and
store in the database the plurality of head-related transfer function measurement pairs specific to the subject.

12. The apparatus of claim 11, wherein the instructions are further executable by the processor to cause the apparatus to:
measure a plurality of reverberation signals associated with the training audio signal,
wherein determining the plurality of head-related transfer function measurement pairs specific to the subject is further based at least in part on using the deep learning scheme on the plurality of head-related impulse responses and the plurality of reverberation signals specific to the subject.

13. The apparatus of claim 11, wherein the deep learning scheme comprises a convolutional neural network.

14. The apparatus of claim 11, wherein the instructions are further executable by the processor to cause the apparatus to:
generate a physical model specific to the subject to measure the plurality of head-related impulse responses associated with the training audio signal for a set of locations specific to the subject, wherein determining the plurality of head-related transfer function measurement pairs is further based at least in part on the physical model specific to the subject.

15. The apparatus of claim 14, wherein the instructions are further executable by the processor to cause the apparatus to:
measure a first head-related transfer function measurement pair for a first location from the set of locations using a first angle;
measure a second head-related transfer function measurement pair for the first location from the set of locations using a second angle that is different from the first angle; and
determine an estimated head-related transfer function measurement pair for the first angle specific to the subject by performing the style transfer operation on the first head-related transfer function measurement pair and the second head-related transfer function measurement pair.

16. The apparatus of claim 9, wherein the instructions are further executable by the processor to cause the apparatus to:
obtain a third head-related transfer function measurement pair by performing a regularization on the second head-related transfer function measurement pair,
wherein outputting the second audio signal based at least in part on the digital representation of the first audio signal and the third head-related transfer function measurement pair.

17. An apparatus, comprising:
means for receiving a digital representation of a first audio signal associated with a location relative to a subject;
means for determining that a first reference head-related transfer function measurement pair in a database satisfies a threshold match value corresponding to content features or style features, or both, associated with the first audio signal;
means for selecting from the database the first reference head-related transfer function measurement pair corresponding to the location of the first audio signal based at least in part on the determining;

means for obtaining a second head-related transfer function measurement pair by performing a style transfer operation on the selected reference head-related transfer function measurement pair based at least in part on a plurality of head-related transfer function measurement pairs specific to the subject, the style transfer operation comprising content features associated with the first reference head-related transfer function measurement pair combined with style features associated with at least one head-related transfer function measurement pair of the plurality of head-related transfer function measurement pairs specific to the subject; and means for outputting a second audio signal based at least in part on the digital representation of the first audio signal and the second head-related transfer function measurement pair.

18. The apparatus of claim 17,
wherein selecting from the database the first reference head-related transfer function measurement pair is based at least in part on the threshold match value.

19. The apparatus of claim 17, further comprising:
means for measuring a plurality of head-related impulse responses associated with a training audio signal;
means for determining the plurality of head-related transfer function measurement pairs specific to the subject using a deep learning scheme on the plurality of head-related impulse responses; and
means for storing in the database the plurality of head-related transfer function measurement pairs specific to the subject.

20. The apparatus of claim 19, further comprising:
means for measuring a plurality of reverberation signals associated with the training audio signal,
wherein determining the plurality of head-related transfer function measurement pairs specific to the subject is further based at least in part on using the deep learning scheme on the plurality of head-related impulse responses and the plurality of reverberation signals specific to the subject.

\* \* \* \* \*